US012306575B2

(12) United States Patent
Matsuzaki et al.

(10) Patent No.: US 12,306,575 B2
(45) Date of Patent: May 20, 2025

(54) DEVELOPER REPLENISHING DEVICE AND IMAGE FORMING APPARATUS

(71) Applicant: CANON KABUSHIKI KAISHA, Tokyo (JP)

(72) Inventors: Hiroomi Matsuzaki, Shizuoka (JP); Hiroki Ogino, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/517,091

(22) Filed: Nov. 22, 2023

(65) Prior Publication Data

US 2024/0176288 A1 May 30, 2024

(30) Foreign Application Priority Data

Nov. 25, 2022 (JP) ................................ 2022-188710

(51) Int. Cl.
*G03G 15/00* (2006.01)
*G03G 15/08* (2006.01)
*G03G 21/20* (2006.01)

(52) U.S. Cl.
CPC ....... *G03G 21/206* (2013.01); *G03G 15/0894* (2013.01)

(58) Field of Classification Search
USPC ........................................................... 399/93
See application file for complete search history.

(56) References Cited

U.S. PATENT DOCUMENTS

2004/0067077 A1* 4/2004 Sudo .................. G03G 15/0879 399/258
2016/0274497 A1* 9/2016 Toda ......................... B65B 1/26

FOREIGN PATENT DOCUMENTS

JP 2013-167756 A 8/2013
JP 2014-228792 A 12/2014
JP 2021-047225 A 3/2021
JP 2021047223 A * 3/2021 ......... G03G 15/0808

* cited by examiner

*Primary Examiner* — Quana Grainger
(74) *Attorney, Agent, or Firm* — VENABLE LLP

(57) ABSTRACT

A developer replenishing device includes a containing portion containing developer and a conveying path forming portion forming a conveying path of developer, with the conveying path including a conveying inlet and a conveying outlet. A moving member includes a developer holding portion movable to a first position at which the holding portion is connected to the containing portion and a second position at which the holding portion is connected to the conveying inlet. In addition, an exhaust air portion generates exhaust air, and a filter passes air flow and does not pass developer. When the moving member is at the second position, the filter is disposed such that developer is held inside the holding portion and exhaust air generated by the exhaust air portion is allowed to enter the holding portion, and the holding portion is located below the conveying inlet in a gravity direction.

16 Claims, 15 Drawing Sheets

DEVELOPER REPLENISHING DEVICE AND IMAGE FORMING APPARATUS

BACKGROUND OF THE INVENTION

Field of the Invention

The present invention relates to a developer replenishing device that is used for an image forming apparatus using an electrophotographic process.

Description of the Related Art

In a conventional electrophotographic image forming apparatus using an electrophotographic process, a toner cartridge is removably installed. Japanese Patent Application Publication No. 2021-047225 discloses a toner cartridge where a container that contains toner (developer) and discharging means for discharging the contained toner from the toner cartridge are integrated.

More specifically, Japanese Patent Application Publication No. 2021-047225 discloses a configuration of a toner cartridge which includes: a container that contains toner; a pump portion that conveys toner; and a conveying path portion of which one end is connected to the pump portion and the other end is connected to a toner discharging port. The container includes a connecting opening portion which is connected to the conveying path portion, and is located above the conveying path portion, and toner is supplied from the container to the conveying path portion via the connecting opening portion. The toner supplied to the conveying path portion is conveyed to the conveying path portion by the pump portion, and is discharged from the discharging port which is located above the toner cartridge in the gravity direction.

SUMMARY OF THE INVENTION

However in the case of the configuration disclosed in Japanese Patent Application Publication No. 2021-47225, a part of the toner supplied to the conveying path portion may remain inside the conveying path portion without being conveyed. For example, if a passage of air that passes above the toner is formed in the conveying path portion, a part of the toner may remain in the conveying path portion, and a conveying amount of toner may be varied.

To solve this problem, a developer replenishing container of the present invention includes:

- a containing portion configured to contain developer;
- a conveying path forming portion configured to form a conveying path of developer, the conveying path including a conveying inlet through which developer enters and a conveying outlet through which developer is discharged to outside;
- a moving member including a holding portion configured to hold developer supplied from the containing portion, the moving member being configured to be movable to a first position at which the holding portion is connected to the containing portion, and a second position at which the holding portion is connected to the conveying inlet of the conveying path;
- an exhaust air portion configured to generate exhaust air; and
- a filter configured to pass air flow and not to pass developer, wherein
- in a case where the moving member is at the second position, the filter is disposed such that developer is held inside the holding portion, and exhaust air generated by the exhaust air portion is allowed to enter the holding portion, and the holding portion is located below the conveying inlet in a gravity direction.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

In the following, a case where the present invention is applied to an electrophotographic type image forming apparatus, which forms an image on a recording medium using an electrophotographic image forming process, will be described. The electrophotographic type image forming apparatus includes, for example, an electrophotographic copier, an electrophotographic printer (e.g. LED printer, laser beam printer), and an electrophotographic facsimile. Further, in the following description, a toner cartridge refers to an integrated developer replenishing device, which is constituted of at least a container to contain toner (developer) and a discharging means for discharging the contained toner from the toner cartridge, and which can be removably installed in an image forming apparatus body.

Embodiment 1

Image Forming Apparatus

Figure 1:
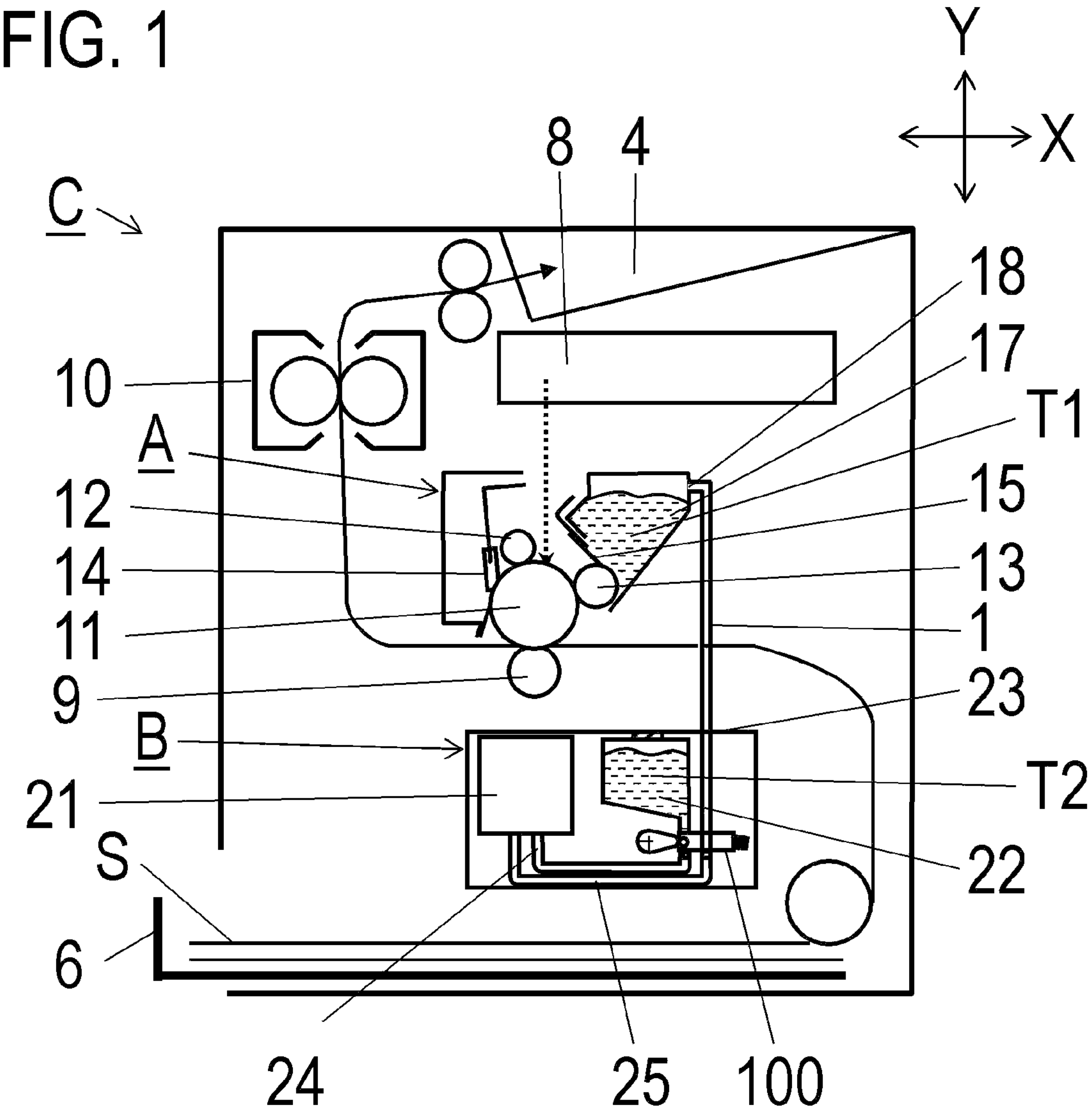
FIG. 1 is a schematic cross-sectional view of an image forming apparatus of Embodiment 1.

First an electrophotographic type image forming apparatus of Embodiment 1 will be described. FIG. 1 is a schematic cross-sectional view depicting a major configuration of the image forming apparatus of Embodiment 1. In the following description, a coordinate system, where the top/bottom direction (vertical direction) in FIG. 1 is the Y direction, and the left/right direction (horizontal direction) in FIG. 1 is the X direction, is used. In Embodiment 1, the X direction is a direction perpendicular to the width direction of a sheet S, which is a sheet type recording material conveyed inside the image forming apparatus.

The image forming apparatus includes an apparatus body C, a process cartridge A which can be removably installed in the apparatus body C, and a toner cartridge B which can be removably installed in the apparatus body C. An image is formed on a sheet S in a state where the process cartridge A and the toner cartridge B are installed in the apparatus body C.

An image forming operation by an image forming portion of the image forming apparatus will be described first. In the image formation, a sheet S is conveyed from a sheet cassette 6, which is disposed in a lower part of the apparatus body C. Further, synchronizing with the conveying of the sheet S, selective exposure is performed by an exposure device 8, on a photosensitive drum 11 (image bearing member), whereby a latent image is formed. Toner T1 contained in a containing portion 17 is supplied to a developing roller 13, and a thin layer of toner T1, formed by a developing blade 15, is carried on the surface of the developing roller 13. By the developing bias applied to the developing roller 13, the developing roller 13 supplies toner T1 to the photosensitive drum 11 in accordance with the latent image, and develops the latent image as a toner image.

The sheet S is conveyed, by such conveying means as a roller, to a contact portion between the photosensitive drum 11 and a transfer roller 9. The developed toner image is then transferred from the photosensitive drum 11 onto the sheet S by a transfer roller 9, on which a transfer bias is applied. Then the sheet S is conveyed to a fixing device 10, and the image is fixed to the sheet S by the fixing device 10. The sheet S that exited from the fixing device 10 is discharged to a paper delivery portion 4, which is disposed on an upper part of the apparatus body C, and thereby the image forming operation completes.

When an amount of toner T1 contained in the process cartridge A becomes less than a predetermined amount, toner T2 contained in the toner cartridge B is supplied to the process cartridge A at an appropriate timing. When toner is supplied, toner T2 is discharged from a discharging portion 23 of the toner cartridge B, and is supplied to the process cartridge A via a main unit path portion 1 of the apparatus body C. The main unit path portion 1 according to Embodiment 1 is a hollow tubular path. The toner cartridge B is located below the process cartridge A, and the discharging portion 23 of the toner cartridge B is disposed in an upper part of the toner cartridge B.

Process Cartridge a

The process cartridge A will be described next in detail. To apply the present invention, the process cartridge needs to include at least a photosensitive drum and process means that acts on the photosensitive drum. Process means includes, for example, charging means for charging the surface of the photosensitive drum, a developing apparatus that forms an image on the photosensitive drum, cleaning means for removing toner remaining on the surface of the photosensitive drum, and the like.

The process cartridge A of Embodiment 1 includes a charging roller 12 (charging means) which is located around the photosensitive drum 11, and a cleaning blade 14 (cleaning means) which has a required elasticity. The process cartridge A also includes the developing roller 13 (developing means), the developing blade 15 and the containing portion 17 to contain toner. The containing portion 17 includes a receiving portion 18 to receive toner supplied from the toner cartridge B. As mentioned above, the process cartridge A is configured to be removable from the apparatus body C.

Toner Cartridge B

Figure 2A:
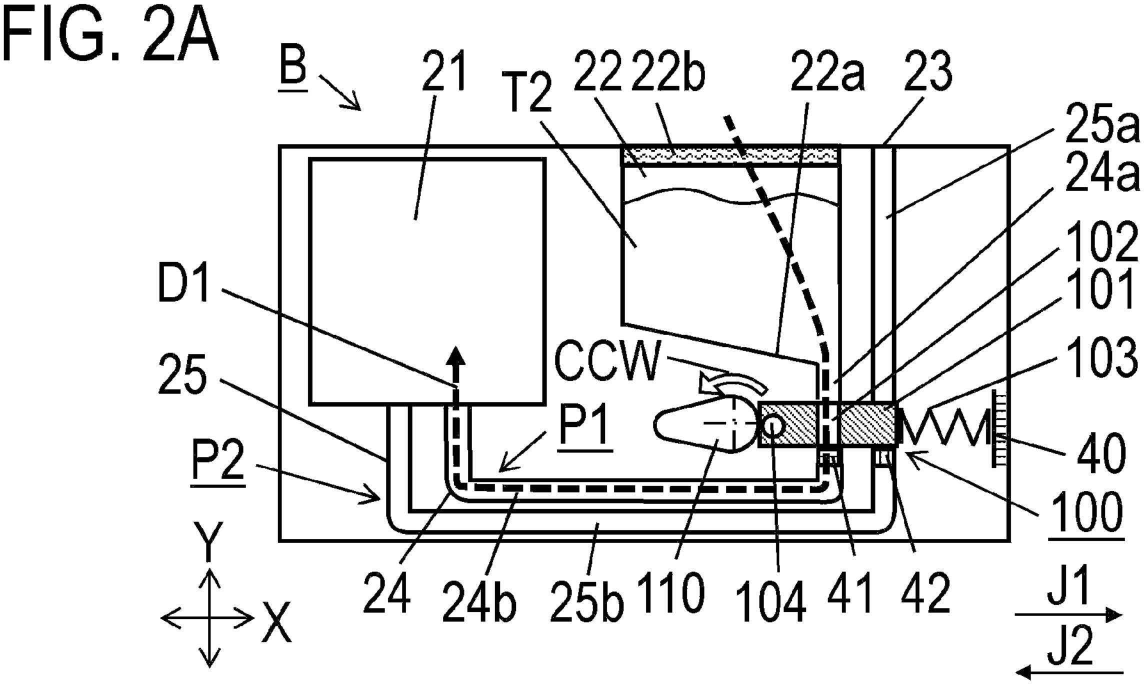
FIGS. 2A and 2B are schematic cross-sectional views of a toner cartridge of Embodiment 1.
Figure 2B:
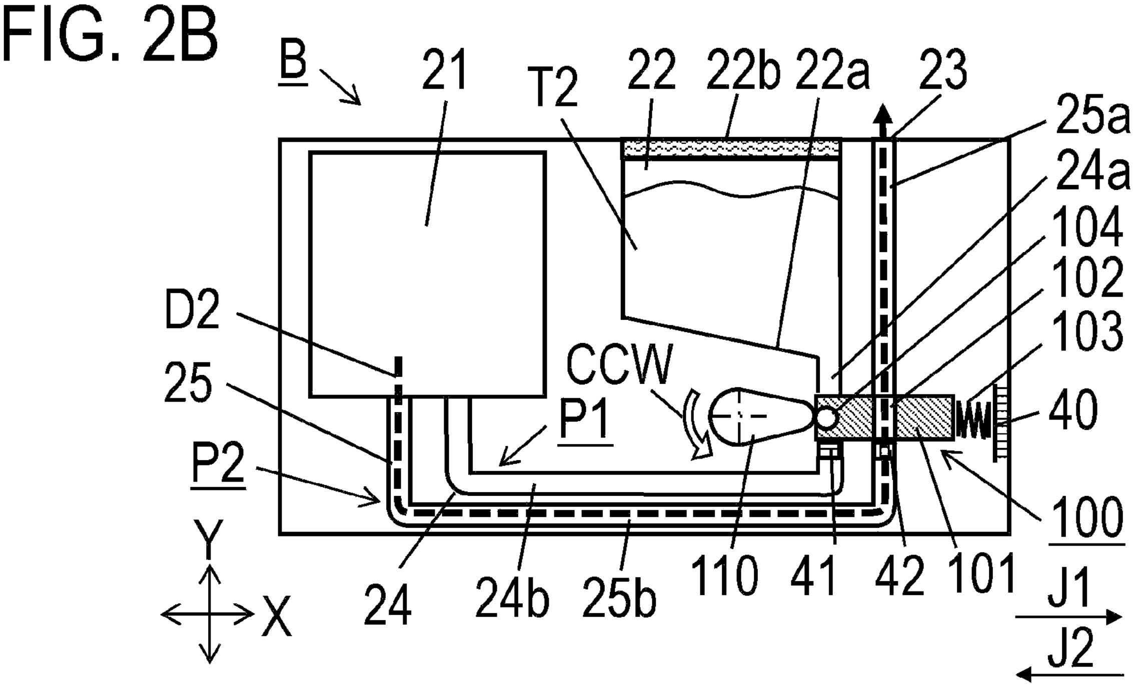

The toner cartridge B will be described next in detail. FIGS. 2A and 2B are schematic cross-sectional views of a major configuration of the toner cartridge B. The toner cartridge B is a developer replenishing device to replenish toner to the process cartridge A when the amount of toner T1 contained in the process cartridge A is decreased. As mentioned above, the toner cartridge B is configured so as to be removable from the apparatus body C. In other words, once the toner T2 contained in the toner cartridge B runs out, the toner cartridge B alone can be replaced, whereby new toner can be supplied to the process cartridge A, and the image forming apparatus can be used continuously.

The toner cartridge B includes a containing portion 22 that contains toner T2 inside, a pump portion 21 that can suction and discharge air by a known pump mechanism, and the discharging portion 23 that discharges toner T2. The pump portion 21 of Embodiment 1 has both functions of an exhaust portion to generate exhaust air, and an intake portion to generate intake air. Further, the toner cartridge B includes: a first passage forming portion 24 which forms a first passage P1 to connect the pump portion 21 and the containing portion 22; a second passage forming portion 25 which forms a second passage P2 to connect the pump portion 21 and the discharging portion 23; and moving means 100. A part of the first passage P1 and a part of the second passage P2 also function as a conveying path to convey toner T2. The moving means 100 is a mechanism to move a predetermined amount of toner from the first passage P1 to the second passage P2.

In FIGS. 2A and 2B, a moving member 101 of the moving means 100 is indicated by the hatched portion, but hatching may be omitted for a part of the member in the cross-section, and hatching may also be omitted in other drawings. FIG. 2A indicates a state of the toner cartridge B where the moving member 101 is at a first position, and toner T2 can be conveyed from the containing portion 22 to the moving member 101. FIG. 2B indicates a state of the toner cartridge B where the moving member 101 is at a second position, and toner T2 can be conveyed from the moving member 101 to the discharging portion 23.

A slope 22*a* is formed in a lower part of the containing portion 22, and toner T2 contained inside the containing portion 22 flows on the slope 22*a*, and then flows into the first passage P1 which opens in a lower part of the containing portion 22. In the containing portion 22, a filter 22*b* is also disposed in an upper part. By the filter 22*b* which passes air flow and does not pass toner T2, an unintended toner T2 leak from the containing portion 22 can be prevented. Furthermore, when the pump portion 21 generates intake air, air can be taken from the outside the toner cartridge B through the containing portion 22 via the filter 22*b*.

Moving means 100 includes a cam member 110, the moving member 101 and an urging member 103. The moving means 100 is disposed below the containing portion 22 and the discharging portion 23. The moving member 101 includes a holding portion 102 and a cam contact portion 104, and is configured to be movable between a first position (position indicated in FIG. 2A) and a second position (position indicated in FIG. 2B). The holding portion 102 is a connecting hole which runs through in the vertical direction, and holds toner T2 while toner T2 is conveyed from the first passage P1 to the second passage P2. The conveying method, when the holding portion 102 holds toner T2 and conveys toner T2 from the first passage P1 to the second passage P2, will be described in detail later.

The first passage forming portion 24 forms, together with moving means 100, the first passage P1 which connects the containing portion 22 and the pump portion 21. When the moving member 101 is at the first position, the holding portion 102 constitutes a part of the first passage P1. The first passage forming portion 24 forms a conveying path 24*a* which connects the containing portion 22 and the holding portion 102, and an intake air path 24*b* which connects the holding portion 102 and the pump portion 21. In the first passage forming portion 24, a space to dispose the moving member 101 is created.

The conveying path 24*a* is a conveying path for toner T2, including a conveying inlet to which air and toner T2 enter from the containing portion 22, and a conveying outlet through which toner T2 is conveyed to the holding portion 102. The conveying path 24*a* is also a supply path to supply toner T2 in the containing portion 22 to the holding portion 102, and this conveying outlet functions as a supply port to supply toner T2 to the holding portion 102. The conveying path 24*a* is configured approximately to be linear, and extends approximately in the vertical direction.

The intake air path 24*b* is an intake air path for air, including an intake air inlet through which air enters from the holding portion 102, and an intake air outlet connected to the pump portion 21. The first passage P1 is constituted of the conveying path 24*a*, the holding portion 102, and the intake air path 24*b*. In other words, the first passage forming portion 24 includes a conveying path forming portion (supply path forming portion) that forms the conveying path (supply path) 24*a*, and an intake air path forming portion that forms the intake air path 24*b*. The conveying path 24*a* also functions as an intake air path where air flows when the pump portion 21 intakes air.

If the pump portion 21 generates intake air when the moving member 101 is at the first position, air flows from the containing portion 22 to the pump portion 21 inside the first passage P1 in the arrow D1 direction, as indicated in FIG. 2A. When the moving member 101 is at the second position, on the other hand, the conveying outlet of the conveying path 24*a* and the intake air inlet of the intake air path 24*b* are closed by the moving member 101, the first passage P1 is interrupted, and air does not flow from the containing portion 22 to the pump portion 21, as indicated in FIG. 2B.

The second passage forming portion 25 forms, together with moving means 100, the second passage P2 which connects the discharging portion 23 and the pump portion 21. When the moving member 101 is at the second position, the holding portion 102 of the moving member 101 constitutes a part of the second passage P2. The second passage forming portion 25 forms a conveying path 25*a* which connects the discharging portion 23 and the holding portion 102, and an exhaust air path 25*b* which connects the holding portion 102 and the pump portion 21. In the second passage forming portion 25, a space to dispose the moving member 101 is created.

The conveying path 25*a* is a conveying path for toner T2, including a conveying inlet to which toner T2 enters from the holding portion 102, and a conveying outlet through which toner T2 is discharged from the toner cartridge B. The conveying path 25*a* is configured approximately to be linear, and extends approximately in the vertical direction. In Embodiment 1, the discharging portion 23 functions as a conveying outlet of the conveying path 25*a*. The exhaust air path 25*b* is an exhaust air path of air, including an exhaust air inlet connected to the pump portion 21, and an exhaust air outlet through which air is sent to the holding portion 102. The second passage P2 is constituted of the conveying path 25*a*, the holding portion 102, and the exhaust air path 25*b*. In other words, the second passage forming portion 25 includes a conveying path forming portion to form the conveying path 25*a*, and an exhaust air path forming portion to form the exhaust air path 25*b*. The conveying path 25*a* also functions as an exhaust air path where air flows when the pump portion 21 exhausts air.

If the pump portion 21 generates exhaust air when the moving member 101 is at the second position, air flows from the pump portion 21 to the discharging portion 23 inside the second passage P2 in the arrow D2 direction, as indicated in FIG. 2B. The second passage P2 extends downward from the discharging portion 23, and the holding portion 102 of the moving member 101 also constitutes the vertically extending portion of the second passage P2. When the moving member 101 is at the first position, on the other hand, the exhaust air outlet of the exhaust air path 25*b* and the conveying inlet of the conveying path 25*a* are closed by the moving member 101, the second passage P2 is interrupted, and air does not flow from the pump portion 21 to the discharging portion 23, as indicated in FIG. 2A. In other words, the moving means 100 is configured such that the moving member 101 moves between the first position and the second position, whereby the holding portion 102 moves between the first passage P1 and the second passage P2.

In Embodiment 1, the capacity of the pump portion 21 is about 10 cc, and the total capacity of the first passage P1 and the capacity of the second passage P2 is about 4 cc. Since the capacity of the passages is half that of the pump portion 21 or less, toner can be appropriately conveyed by the air flow generated by the pump portion 21. Further, the capacity of the holding portion 102 of the moving member 101 is about 0.4 cc, and the permeability of the filter is about 0.05 cc ($cm^2$·sec). The material of toner T2 is a copolymer of styrene and acrylic, and a particle diameter of toner T2 is about 6 μm. The above mentioned various conditions are not limited thereto, and may be selected appropriately based on the type and characteristics of the toner, and the shape, material, disposition and the like of each member.

Conveying Toner Inside Toner Cartridge B

Toner T2 contained in the containing portion 22 of the toner cartridge B is supplied to the process cartridge A via the discharging portion 23. Next a method for conveying toner T2 from the containing portion 22 to the discharging portion 23 inside the toner cartridge B will be described.

The conveying path 24*a* which constitutes the first passage P1 is formed in the lower part of the containing portion 22 of the toner cartridge B, and the gravity acts in a direction of pouring toner T2 inside the containing portion 22 into the first passage P1. The angle of the slope 22*a* formed in the lower part of the containing portion 22 is preferably set to at least a repose angle of the toner T2, so that toner T2 drops toward the first passage P1 by the gravity.

When the moving member 101 is at the first position, toner T2 is conveyed from the containing portion 22 to the holding portion 102 via the conveying path 24*a* by the gravity and intake air generated by the pump portion 21. Here the conveying direction of toner T2 is the arrow D1 direction in FIG. 2A. In Embodiment 1, a filter 41, which passes the air flow and does not pass toner, is disposed in the first passage P1 so that toner T2 is held in the holding portion 102. Because of the filter 41, toner T2 is held inside the holding portion 102 without reaching the pump portion 21. Using this configuration, the toner cartridge B of Embodiment 1 can fill toner T2 in the containing portion 22 into the holding portion 102 of the moving member 101 at the first position.

The moving member 101 moves straight to the second position after toner is filled in the holding portion 102 at the first position. The moving direction at this time is a J1 direction which is parallel with the horizontal X direction. When the moving member 101 moves from the second position to the first position, on the other hand, the moving member 101 moves in a J2 direction, which is opposite the J1 direction. The moving mechanism of the moving member 101 will be described in detail later.

Because the moving member 101 moves to the second position, the holding portion 102, together with toner T2 therein, moves from the first passage P1 to the second passage P2. Here the moving member 101 moves such that toner overflowing from the holding portion 102 is scraped off, and a predetermined amount of toner is conveyed from the first passage P1 to the second passage P2. In other words, when the moving member 101 moves to the second position, the holding portion 102 in the state of holding toner T2 therein constitutes a part of the second passage P2. In the second passage P2, a filter 42, similar to the filter 41, is disposed so that toner T2 is held in the holding portion 102.

When the moving member 101 in the state of holding toner T2 is at the second position, the pump portion 21 exhausts air, whereby toner T2 inside the holding portion 102 is conveyed to the discharging portion 23 via the conveying path 25*a*. Then toner T2 is discharged from the toner cartridge B via the discharging portion 23, and is supplied to the process cartridge A. The conveying direction of toner T2 here is the arrow D2 direction in FIG. 2B.

Moving Means 100

Figure 3A:
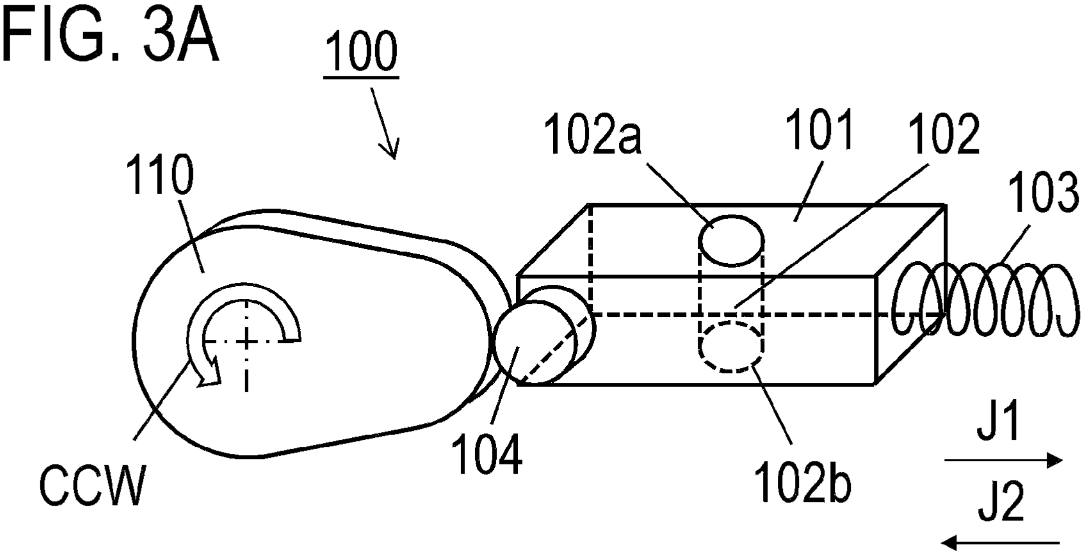
FIGS. 3A and 3B are perspective views of moving means of Embodiment 1.
Figure 3B:
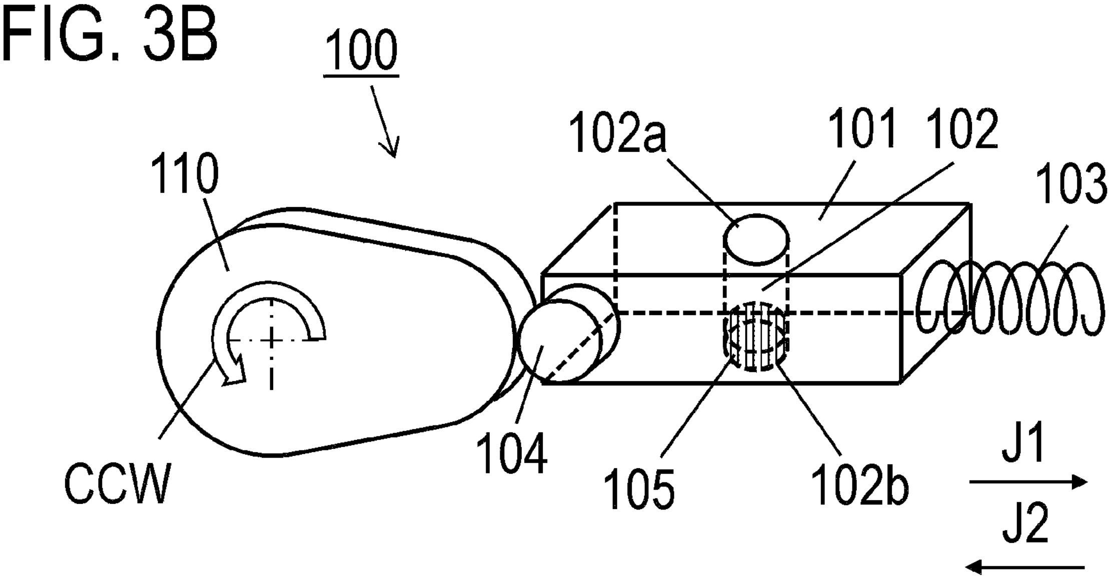
Figure 4A:
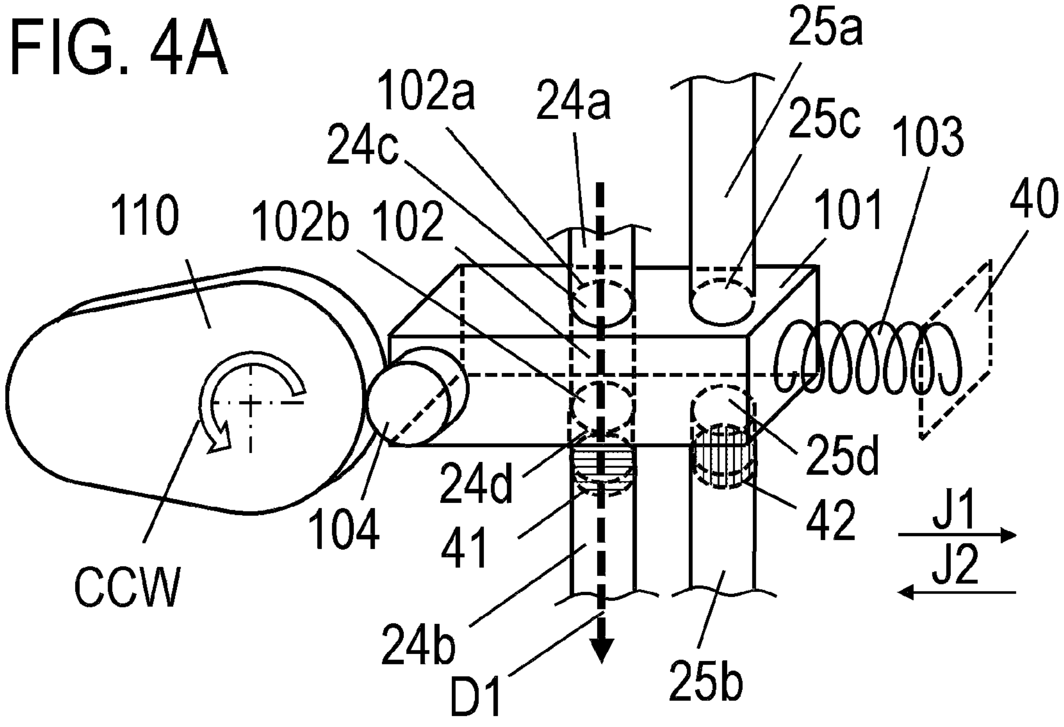
FIGS. 4A and 4B are perspective views of the moving means and a passage of Embodiment 1.
Figure 4B:
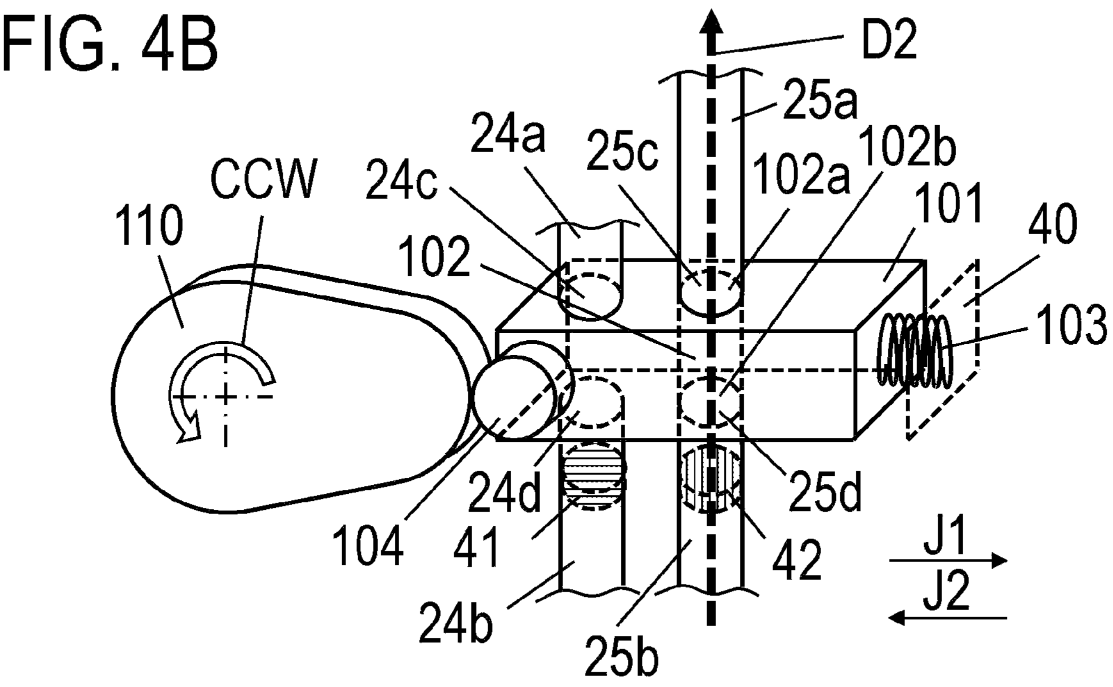

A detailed configuration of the moving means 100, for moving toner T2 from the first passage P1 to the second passage P2, will be described. As mentioned above, the moving means 100 is a reciprocating mechanism for the moving member 101 to move back and forth. FIG. 3A is a perspective view of the moving means 100 according to Embodiment 1. FIG. 3B is a perspective view of the moving means 100 according to modification. FIG. 4A is a perspective view depicting a state where the moving member 101 is at the first position, and the holding portion 102 of the moving member 101 constitutes a part of the first passage P1. FIG. 4B is a perspective view depicting a state where the moving member 101 is at the second position, and the holding portion 102 of the moving member 101 constitutes a part of the second passage P2.

As mentioned above, the moving means 100 includes the cam member 110, the moving member 101, and the urging member 103. The moving member 101 is constituted of: the holding portion 102 which has a cylindrical space to hold toner therein, and runs through the moving member 101 in the vertical direction; and the cam contact portion 104 which is contacted by the cam member 110. The holding portion 102 has a first opening 102*a* which opens in the upper part of the moving member 101, and the second opening 102*b* which is disposed on the opposite end of the first opening 102*a*, and opens in the lower part of the moving member 101. The holding portion 102 of Embodiment 1 has a cylindrical shape, but the holding portion 102, according to the present invention, may have a polygonal shape.

The cam member 110 is a pressing portion, which is disposed to be rotatable in the CCW direction indicated in FIG. 3A and the like, is rotary-driven by a driving source disposed in the apparatus body C, and presses the moving member 101. When the cam member 110 rotates in the CCW direction, the cam contact portion 104 of the moving member 101 is pressed, whereby the moving member 101 moves from the first position indicated in FIG. 4A to the second position indicated in FIG. 4B. Here the moving direction of the moving member 101 is the J1 direction.

The urging member 103 is disposed between the moving member 101 and a frame 40 of the toner cartridge B, and is a spring that urges the moving member 101 in the J2 direction, which is opposite the J1 direction. The moving member 101 is always urged by the urging member 103 in the J2 direction, hence if the cam member 110 rotates when the moving member 101 is at the second position, the moving member 101 moves from the second position to the first position. In this way, the moving member 101 reciprocatingly moves between the first position and the second position by the pressing force of the cam member 110 and the urging force of the urging member 103.

As illustrated in FIG. 4A, when the moving member 101 is at the first position, the first opening 102*a* of the holding portion 102 is connected with a third opening 24*c* of the conveying path 24*a*; and the second opening 102*b* of the holding portion 102 is connected with a fourth opening 24*d* of the intake air path 24*b*. When the first opening 102*a* and the third opening 24*c* are connected, and the second opening 102*b* and the fourth opening 24*d* are connected, the first passage P1 is connected from the containing portion 22 to the pump portion 21. The third opening 24*c* is a conveying outlet of the conveying path 24*a* (supply port of supply path), and the fourth opening 24*d* is an intake air inlet of the intake air path 24*b*.

The filter 41 is disposed inside the intake air path 24*b* below the fourth opening 24*d* such that the fourth opening 24*d* is closed. In FIGS. 4A and 4B, the filter 41 is indicated by horizontal hatching. By this configuration, toner T2, conveyed from the containing portion 22, is blocked by the filter 41 and is held inside the holding portion 102. In other words, the filter 41 is disposed such that the filter 41, together with the holding portion 102, holds toner T2 inside the holding portion 102, and allows the intake air generated by the pump portion 21 to enter the intake air path 24*b*.

Further, as illustrated in FIG. 4B, when the moving member 101 is at the second position, the first opening 102*a* of the holding portion 102 is connected with a fifth opening 25*c* of the conveying path 25*a*, and the second opening 102*b* of the holding portion 102 is connected with a sixth opening 25*d* of the exhaust air path 25*b*. When the first opening 102*a* and the fifth opening 25*c* are connected, and the second opening 102*b* and the sixth opening 25*d* are connected, the second passage P2 is connected from the discharging portion 23 to the pump portion 21. The fifth opening 25*c* is a conveying inlet of the conveying path 25*a*, and the sixth opening 25*d* is an exhaust air inlet of the exhaust air path 25*b*.

The filter 42 is disposed inside the second passage P2 below the sixth opening 25*d* such that the sixth opening 25*d* is closed. In FIGS. 4A and 4B, the filter 42 is indicated by vertical hatching. By this configuration, toner T2 is blocked by the filter 42 and is held inside the holding portion 102 when the moving member 101 is moved to the second position. In other words, filter 42 is disposed such that the filter 42, together with the holding portion 102, holds toner T2 inside the holding portion 102, and allows the exhaust air generated by the pump portion 21 to enter the holding portion 102.

In the toner cartridge B of Embodiment 1, the filter 41 is disposed in the first passage forming portion 24 and the filter 42 is disposed in the second passage forming portion 25, but the present invention is not limited to this configuration. For example, as illustrated in FIG. 3B, a filter 105 may be disposed inside the holding portion 102, instead of inside the first passage forming portion 24 and the second passage forming portion 25. By disposing the filter 105 so as to close the second opening 102*b* located in the lower part of the holding portion 102, toner T2 is held inside the holding portion 102, and air inside the holding portion 102 can be passed. In other words, the place where the filter is disposed may be appropriately changed considering the conveying amount of toner, manufacturing cost and the like.

Filling Toner from Containing Portion 22 to Holding Portion 102

The method for filling toner T2 from the containing portion 22 to the holding portion 102 of the moving member 101 and the functional effects thereof will be described in detail. As mentioned above, when toner is filled into the holding portion 102, the moving member 101 is at the first position, and in this state the holding portion 102 constitutes a part of the first passage P1, and the first passage P1 is connected from the pump portion 21 to the containing portion 22. Here the pump portion 21 generates the intake air, whereby the outside air is taken in via the filter 22*b* of the containing portion 22, and the air flow in the arrow D1 direction is generated. Then toner T2 contained in the containing portion 22 is poured into the holding portion 102 by this air flow and gravity. Toner T2 poured into the holding portion 102 is blocked by the filter 41 and is filled into the holding portion 102. Here the toner filled into the holding portion 102 by the function of the intake air changes the state from the flowing state to the consolidated state, and a predetermined amount of toner T2 is held in the holding portion 102.

By the above mentioned configuration, the toner cartridge B according to Embodiment 1 exhibits two special functional effects when toner is filled. First, toner T2 is conveyed from the containing portion 22 to the holding portion 102 by the suction of the pump portion 21 and gravity, hence there is no need to dispose a conveying member and a conveying mechanism in the containing portion 22. Furthermore, manufacturing cost can be reduced and space in the toner cartridge B can be conserved. Also all toner T2 contained in the containing portion 22 can be used without waste.

Second, by the suction of the pump portion 21, toner T2 is held in the holding portion 102 with the filter 41 and consolidated inside the holding portion 102. Therefore compared with the configuration in which the holding portion 102 is filled with toner by gravity alone, more toner can be filled and the amount of toner that is filled is stabilized in the configuration according to Embodiment 1. Moreover, in this configuration, filling efficiency is high and a predetermined amount of toner T2 can be stably conveyed to the holding portion 102.

Conveying Toner from Holding Portion 102 to Discharging Portion 23

Figure 5A:
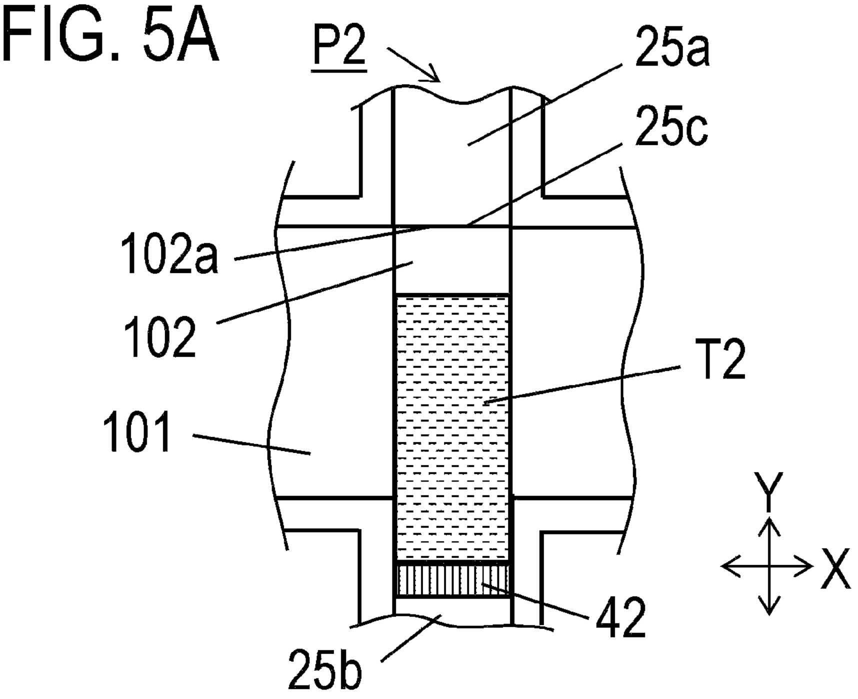
FIGS. 5A and 5B are schematic cross-sectional views depicting a state where toner is conveyed from a holding position of Embodiment 1.
Figure 5B:
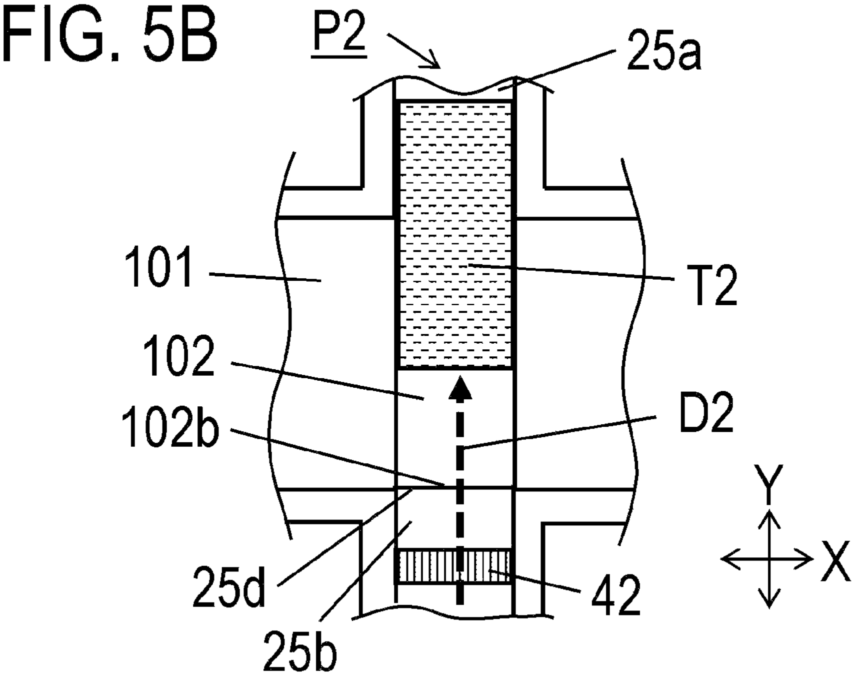

Next the method for conveying toner T2 from the holding portion 102 to the discharging portion 23 and discharging toner T2 from the toner cartridge B, and the functional effects thereof, will be described in detail. As mentioned above, when toner is conveyed, the moving member 101 moves from the first position to the second position. FIG. 5A is a schematic cross-sectional view depicting a state of an area around the holding portion 102 immediately after the moving member 101 moved to the second position. FIG. 5B is a schematic cross-sectional view depicting a state where the moving member 101 moved to the second position and the pump portion 21 generates exhaust air, whereby toner T2 is conveyed toward the discharging portion 23.

When the moving member 101 moved to the second position, toner T2 held in the holding portion 102 drops onto the filter 42 disposed in the second passage P2 by gravity, as illustrated in FIG. 5A. In other words, by the movement of the moving member 101, a predetermined amount of toner T2 is conveyed from the first passage P1 to the second passage P2, and toner T2 is held on the filter 42.

When the moving member 101 is at the second position, the holding portion 102 constitutes a part of the second passage P2, and the second passage P2 is connected from the pump portion 21 to the discharging portion 23. Here the pump portion 21 generates exhaust air, whereby the air flow in the arrow D2 direction is generated. Then toner T2, conveyed to the second passage P2, is conveyed toward the discharging portion 23 by this air flow. Toner T2 conveyed to the discharging portion 23 is discharged from the toner cartridge B, and is conveyed through the main unit path portion 1 of the apparatus body C, and reaches the containing portion 17 of the process cartridge A via the receiving portion 18 of the process cartridge A.

In Embodiment 1, the holding portion 102 of the second passage P2 and the conveying path 25*a* extend upward approximately in the vertical direction. By this configuration, the toner cartridge B according to Embodiment 1 exhibits three special functional effects when toner is discharged. First, toner T2 is not conveyed in the horizontal direction but is conveyed only in the direction approximately parallel with the gravity direction in the second passage P2, hence all toner T2 inside the second passage P2 can be conveyed to the discharging portion 23 without waste, using the exhaust air generated by the pump portion 21. Moreover, a predetermined amount of toner T2 can be stably conveyed from the holding portion 102 to the discharging portion 23.

Second, toner T2 is moved from the holding portion 102 onto the filter 42 by gravity, hence there is no need to dispose a conveying member and a conveying mechanism to move toner T2 from the holding portion 102 of the moving member 101 which moved to the second position. Moreover, manufacturing cost can be reduced and space in the toner cartridge B can be conserved.

Third, the holding portion 102 and the area around the holding portion 102 of the exhaust air path 25*b* extend approximately in the vertical direction, hence the filter 42 becomes the bottom surface to held toner T2, and toner T2 that drops by gravity is reliably held in the second passage P2.

As described above, according to the configuration of Embodiment 1, a predetermined amount of toner T2 is conveyed from the first passage P1 to the second passage P2 by the moving member 101, and this predetermined amount of toner T2 is conveyed to the discharging portion 23 using the exhaust air generated by the pump portion 21, hence a predetermined amount of toner can be stably conveyed.

The flow rate and flow speed of the exhaust air and the intake air generated by the pump portion 21 may be set appropriately considering the permeability of the filter 41 and filter 42, the characteristics of toner T2 (e.g. particle diameter, density), the diameter and length of the first passage P1 and second passage P2, and the like. The permeability of the filter 41 and filter 42 may be appropriately determined in accordance with the flow rate and flow speed of the exhaust air and the intake air generated by the pump portion 21.

In Embodiment 1, suction of the pump portion 21 is used to fill toner into the holding portion 102. However the present invention may be applied to the configuration of using only gravity without using air flow, or to the configuration of disposing a conveying member to convey toner and fill the toner from the containing portion 22 to the holding portion 102.

Other Functional Effects

Other functional effects of the toner cartridge B according to Embodiment 1 will be described. As mentioned above, the intake air in the arrow D1 direction and the exhaust air in the arrow D2 direction generated by the pump portion 21 are used for conveying toner inside the toner cartridge B. Here a conventional pump, which can suction air from one end and discharge air from the other end, is used as the pump portion 21, hence there is no need to dispose a plurality of pumps. Moreover, manufacturing cost can be reduced, and space in the toner cartridge B can be conserved.

In the case of pump portion 21, the air flow in the arrow D1 direction, which is generated by suction to convey toner to the holding portion 102, can be directly used for the air flow in the arrow D2 direction, which is generated by the discharge to convey toner to the discharging portion 23. Moreover, according to the configuration of Embodiment 1, toner can be conveyed using the air flow efficiently.

Further, in Embodiment 1, one pump portion 21 performs both conveying toner to the holding portion 102 in the first passage P1, and conveying toner to the discharging portion 23 in the second passage P2. Therefore, compared with the configuration in which a conveying member, which is different from a pump, is used for one or both of the toner conveyances, the configuration according to Embodiment 1 can reduce manufacturing cost, and conserve space of the toner cartridge B.

Embodiment 2

Embodiment 2 according to the present invention will be described next. A difference between Embodiment 2 from Embodiment 1 is the configuration of the moving means disposed in the toner cartridge B. In the description of Embodiment 2, a composing element the same as Embodiment 1 is denoted with a same reference sign, and description thereof is omitted, and only characteristic composing elements of Embodiment 2 will be described. For example, the configuration is the same as Embodiment 1, except for the image forming process, the configuration of the process cartridge A, and the moving means for toner of the toner cartridge B.

The moving means 100 of Embodiment 1 is the reciprocating mechanism for the moving member 101 to move reciprocatingly, but moving means 200 of Embodiment 2 is a rotating mechanism for a moving member 201 to move rotationally. Now the configuration of the toner cartridge B according to Embodiment 2, which can convey a predetermined amount of toner stably by rotation of the moving member 201, will be described.

Configuration of Toner Moving Means

Figure 6A:
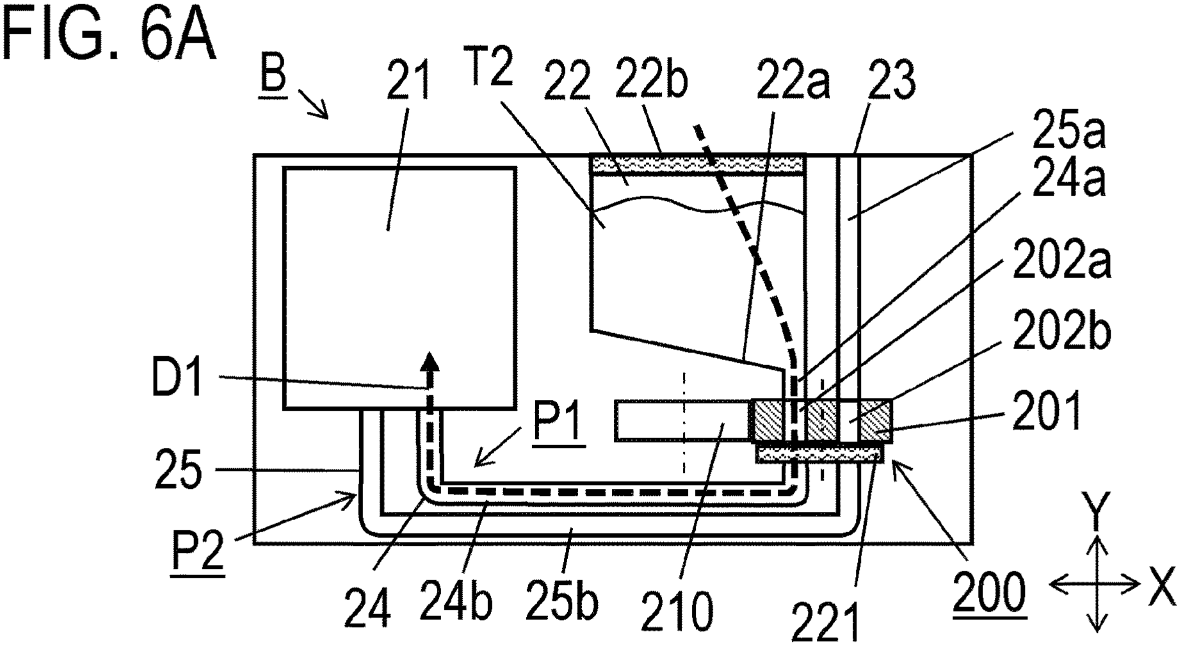
FIGS. 6A and 6B are schematic cross-sectional views of a toner cartridge of Embodiment 2.
Figure 6B:
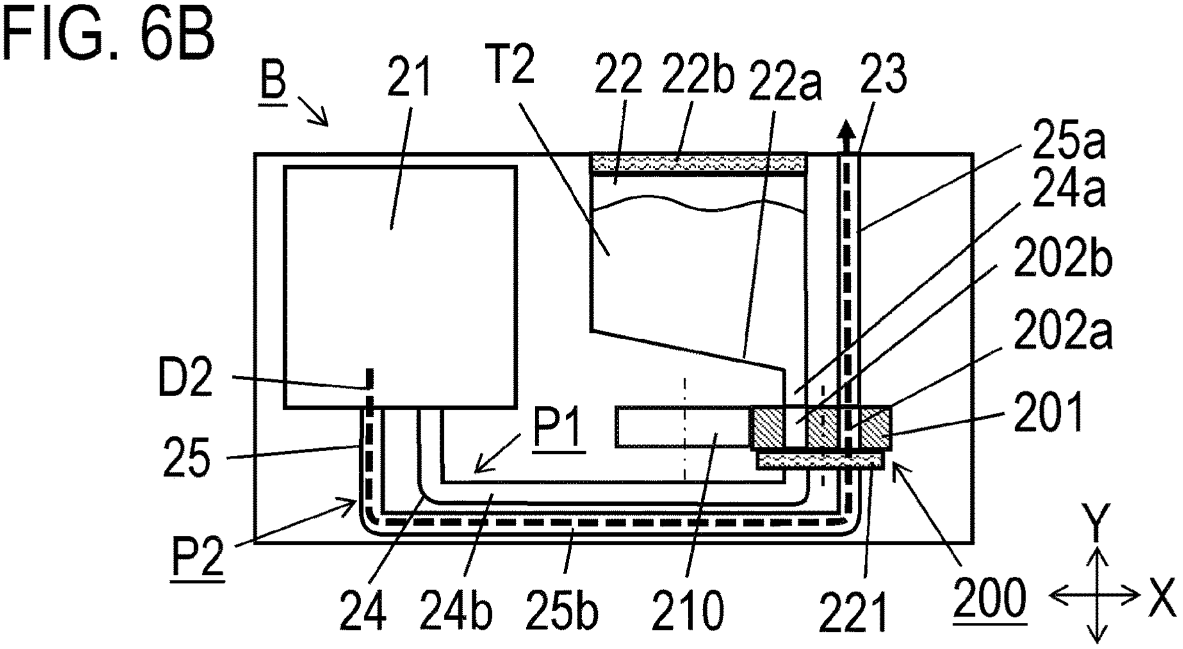
Figure 7A:
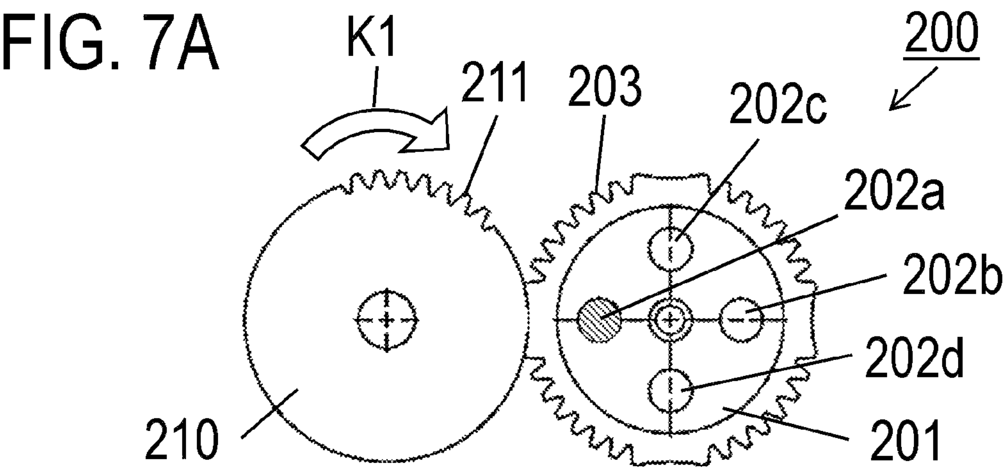
FIGS. 7A to 7C are top views of moving means of Embodiment 2.
Figure 7B:
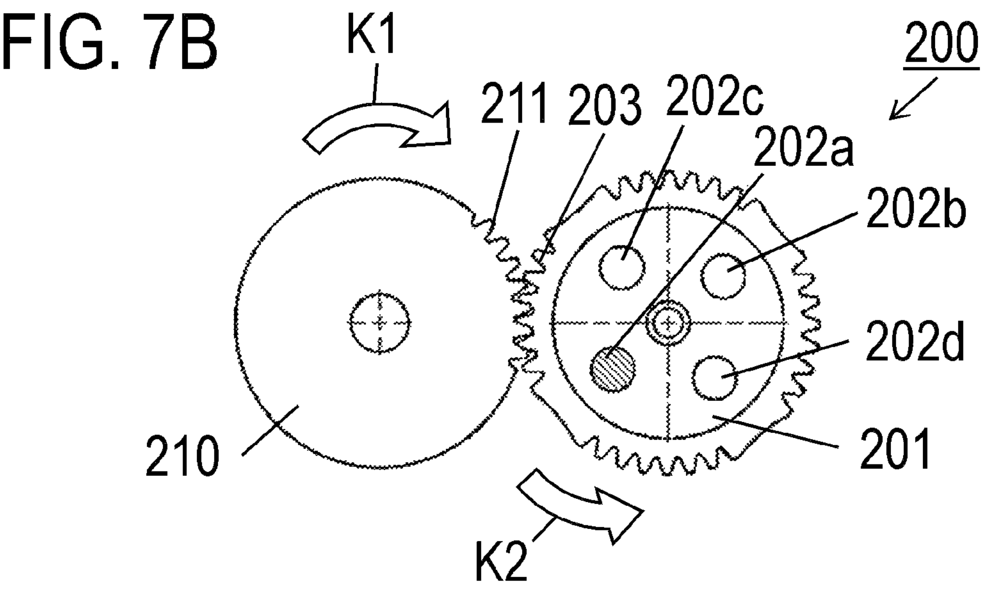
Figure 7C:
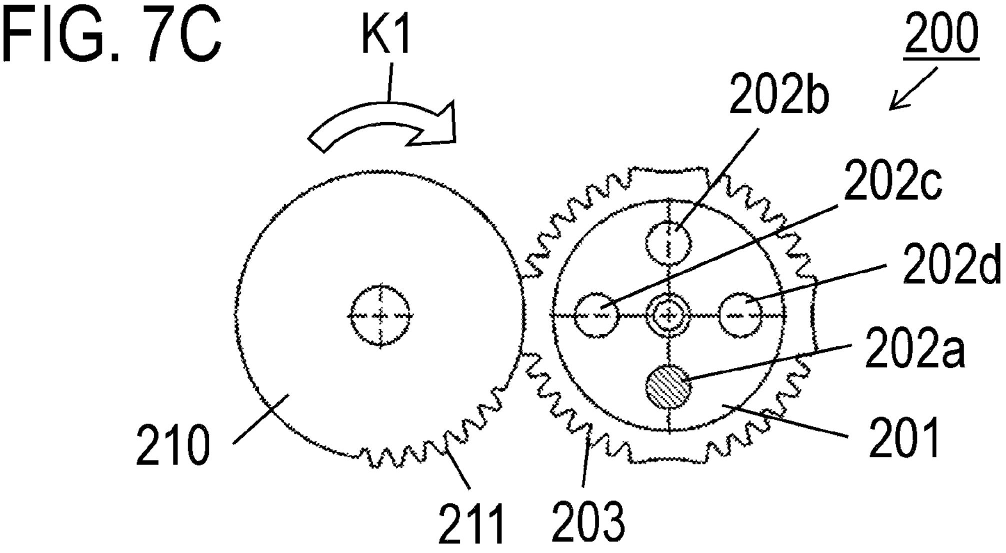

The toner cartridge B of Embodiment 2 includes the moving means 200 for moving a predetermined amount of toner from the first passage P1 to the second passage P2. FIGS. 6A and 6B are schematic cross-sectional views depicting a major configuration of the toner cartridge B of Embodiment 2. FIG. 6A indicates a state of the toner cartridge B where the moving member 201 is at the first position, and toner T2 can be conveyed to the moving member 201. FIG. 6B indicates a state of the toner cartridge B where the moving member 201 is at the second position, and toner T2 can be conveyed from the moving member 201. FIGS. 7A to 7C are top views of the moving means 200 depicting a state of the moving member 201 rotating.

The moving means 200 includes: a moving member 201 that can rotate around the rotation axis line extending in the vertical direction; a teeth missing gear 210 which can rotate around the rotation axis line extending in the vertical direction and engages with the moving member 201; and a filter 221 which is disposed in the lower part of the moving member 201. The moving member 201 includes a plurality of holding portions 202, each of which is a cylindrical connecting hole which runs through in the vertical direction. There are four holding portions 202 that are disposed in the rotating direction of the moving member 201 at equal 90° intervals. In the following description, the plurality of holding portions 202 may be separately referred to as a first holding portion 202*a*, a second holding portion 202*b*, a third holding portion 202*c*, and a fourth holding portion 202*d*, if necessary. When the moving means 200 is viewed from the top, the line connecting the center of the first holding portion 202*a* and the center of the second holding portion 202*b* passes through the rotation center of the moving member 201; and the line connecting the center of the third holding portion 202*c* and the center of the fourth holding portion 202*d* passes through the rotation center of the moving member 201.

As illustrated in FIG. 6A, when the moving member 201 is at the first position, the first holding portion 202*a* is connected with the conveying path 24*a* and the intake air path 24*b*, and constitutes a part of the first passage P1, and the first passage P1 is connected from the containing portion 22 to the pump portion 21. The first passage P1 is constituted of the conveying path 24*a*, one of the holding portions 202 and the intake air path 24*b*.

Further, according to Embodiment 2, when the moving member 201 is at the first position, the second holding portion 202*b* is connected with the second passage forming portion 25, and constitutes a part of the second passage P2, and the second passage P2 is connected from the discharging portion 23 to the pump portion 21.

FIG. 6B indicates a state of the toner cartridge B where the moving member 201 is rotated 180° from the state indicated in FIG. 6A, and the moving member 201 is at the second position. As illustrated in FIG. 6B, when the moving member 201 is at the second position, the first holding portion 202*a* is connected with the conveying path 25*a* and the exhaust air path 25*b*, and constitutes a part of the second passage P2, and the second passage P2 is connected from the pump portion 21 to the discharging portion 23. The second passage P2 is constituted of the conveying path 25*a*, one of the holding portions 202 and the exhaust air path 25*b*.

When the moving member 201 is at the second position, the second holding portion 202*b* is connected with the conveying path 24*a* and the intake air path 24*b*, the second holding portion 202*b* constitutes a part of the first passage P1, and the first passage P1 is connected from the containing portion 22 to the pump portion 21. In other words, the moving member 201 at the first position and the moving member 201 at the second position are 180° different in the rotation phase.

In the same manner, when the third holding portion 202*c* is connected with the conveying path 24*a* and the intake air path 24*b*, the fourth holding portion 202*d* is connected with the conveying path 25*a* and the exhaust air path 25*b*. Further, when the fourth holding portion 202*d* is connected with the conveying path 24*a* and the intake air path 24*b*, the third holding portion 202*c* is connected with the conveying path 25*a* and the exhaust air path 25*b*. In other words, in the toner cartridge B of Embodiment 2, when the first passage P1 is connected from the containing portion 22 to the pump portion 21, the second passage P2 is always connected from the discharging portion 23 to the pump portion 21.

The teeth missing gear 210, in which a gear portion 211 is disposed in a part of the circumferential direction, is rotary-driven by a driving source disposed in the apparatus body C. As the teeth missing gear 210 rotates, the gear portion 211 engages with a gear portion 203 of the moving member 201, whereby the teeth missing gear 210 rotates the moving member 201. FIG. 7A indicates a state of the moving means 200 immediately before the gear portion 211 and the gear portion 203 are engaged. FIG. 7B indicates a state of the moving means 200 while the gear portion 211 and the gear portion 203 are engaged. FIG. 7C indicates a state of the moving means 200 immediately after the gear portion 211 and the gear portion 203 are engaged.

When the teeth missing gear 210 rotates in a rotating direction K1, the moving member 201 rotates in a rotating direction K2. In the moving means 200 of Embodiment 2, each gear portion is configured such that the moving member 201 performs ¼ rotation (rotates 90°) when the teeth missing gear 210 rotates once (rotates) 360°. In other words, even if the teeth missing gear 210 rotates from the state indicated in FIG. 7C, the moving member 201 does not rotate until the gear portion 211 engages with the gear portion 203 of the moving member 201.

Figure 8A:
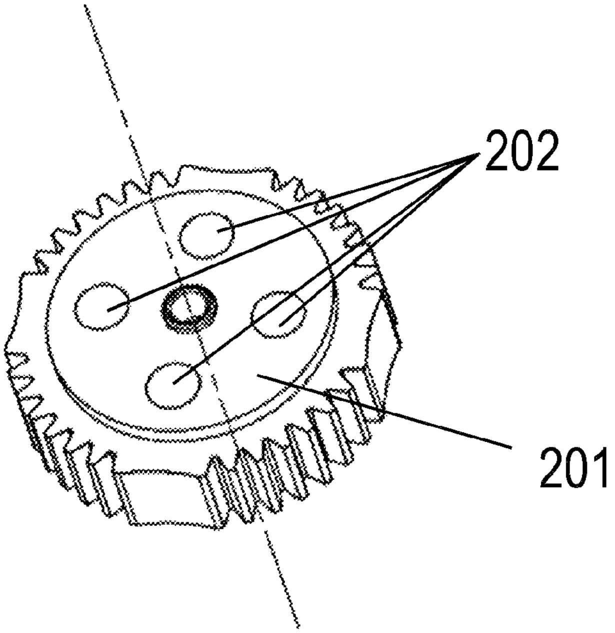
FIGS. 8A and 8B are perspective views of a moving member of Embodiment 2.
Figure 8B:
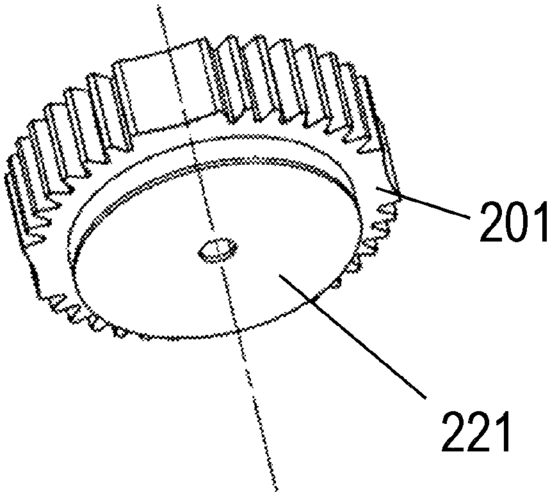

FIG. 8A is a perspective view when the moving member 201 is viewed from the top. FIG. 8B is a perspective view when the moving member 201 and the filter 221 are viewed from the bottom. The filter 221 is disposed in contact with the lower surface of the moving member 201, so as to cover all the holding portions 202, and allows air flow to pass but does not allow toner T2 to pass. By this configuration, the openings of the four holding portions 202 on one end are always covered by the filter 221, regardless the rotation phase of the moving member 201. In other words, the filter 221 is disposed such that the filter 221, together with the holding portion 202, holds toner T2 inside the holding portions 202, and allows the intake air generated by the pump portion 21 to enter the intake air path 24*b*, and allows the exhaust air generated by the pump portion 21 to enter the holding portions 202.

Conveying Toner Inside Toner Cartridge B

Next a method for conveying toner T2 from the containing portion 22 to the discharging portion 23 inside the toner cartridge B of Embodiment 2 will be described. In toner cartridge B of Embodiment 2, toner T2 contained in the containing portion 22 is conveyed to the discharging portion 23 via the first passage P1, the holding portions 202 of the moving member 201, and the second passage P2. In the following, the case of conveying toner T2 using the first holding portion 202*a* will be described as an example.

First, in a state where the moving member 201 is at the first position, the pump portion 21 generates the intake air in the first passage P1, whereby the outside air is taken in from the containing portion 22, and air flow in a direction from the containing portion 22 to the pump portion 21 (arrow D1 direction) is generated inside the first passage P1. Then toner T2 is conveyed from the containing portion 22 to the first holding portion 202*a* by gravity and the intake air, and is supported by the filter 221. By the intake air generated by the pump portion 21, toner T2 is held in the first holding portion 202*a* in a consolidated state. Further, when the second holding portion 202*b* is holding toner T2, toner T2 can be conveyed from the second holding portion 202*b* to the discharging portion 23 by the pump portion 21 generating the exhaust air in the second passage P2.

Then as the teeth missing gear 210 rotates, the moving member 201 rotationally moves from the first position to the second position. By the moving member 201 moving to the second position, the first holding portion 202*a*, together with the toner T2 therein, moves from the first passage P1 to the second passage P2. Then the moving member 201 moves so as to scrape off toner overflowing from the first holding portion 202*a*, whereby a predetermined amount of toner is conveyed from the first passage P1 to the second passage P2. Then the first holding portion 202*a* in the state of holding toner T2 therein constitutes a part of the second passage P2.

By the pump portion 21 generating the exhaust air in the second passage P2 in a state where the moving member 201 is located at the second position, the air flow in the direction from the pump portion 21 to the discharging portion 23 (arrow D2 direction) is generated inside the second passage P2. Then toner T2 inside the first holding portion 202*a* is conveyed to the discharging portion 23 via the second passage P2, is discharged from the toner cartridge B, and is supplied to the process cartridge A. Further, the pump portion 21 generates the intake air in the first passage P1 at this time, whereby toner T2 can be conveyed to the second holding portion 202*b*.

According to the configuration of Embodiment 2, while the moving member 201 moves from the first position to the second position, toner T2 can be conveyed from the containing portion 22 to the third holding portion 202*c*, and toner T2 can be conveyed from the fourth holding portion 202*d* to the discharging portion 23. Furthermore, according to the configuration of Embodiment 2, while the moving member 201 moves from the second position to the first position, toner T2 can be conveyed from the containing portion 22 to the fourth holding portion 202*d*, and toner T2 can be conveyed from the third holding portion 202*c* to the discharging portion 23.

As described above, according to the configuration of Embodiment 2, toner amount to be supplied from the containing portion 22 of the toner cartridge B to the containing portion 17 of the process cartridge A can be controlled, and thereby a predetermined amount of toner can be stably conveyed. Further, a single pump performs the exhaust and intake of air, hence just like Embodiment 1, manufacturing cost can be reduced, space in the toner cartridge B can be conserved, and toner can be conveyed at high efficiency.

Furthermore, a plurality of holding portions 202 are disposed in the moving member 201, hance the operation to supply toner from the containing portion 22 to the holding portion 202 and the operation to discharge the toner from the holding portion 202 to the discharging portion 23 can be performed continuously in a state where the moving member 201 remains still. Therefore according to the configuration of Embodiment 2, compared with the configuration of Embodiment 1, a number of times of moving and a moving time of the moving member 201 can be reduced, whereby toner can be more efficiently supplied from the toner cartridge B to the process cartridge A.

In Embodiment 2, the teeth missing gear 210 is used for moving means 200, but the application of the present invention is not limited to this configuration. For example, the present invention can be suitably applied to a configuration where a known Geneva mechanism is used for the moving means.

In Embodiment 2, the moving member 201 having four identical shaped holding members 202 disposed at 90° intervals was used, but application of the present invention is not limited to this configuration. For example, 2, 3, or 5 or more holding portions 202 may be disposed in the moving member 201, and the holding portion 202 may have a shape other than a cylinder. In other words, the present invention can be suitably applied to a configuration where the holding portions to hold toner are disposed in the moving member at predetermined angle intervals. In this case, to apply the present invention, it is preferable that the first passage forming portion 24, the second passage forming portion 25 and the moving member 201 are configured such that when any one of the holding portions is connected with the first passage P1, another one of the holding portions is connected with the second passage P2.

Embodiment 3

Embodiment 3 according to the present invention will be described next. A difference of Embodiment 3 from Embodiment 1 is the configuration of the pump portion. In the description of Embodiment 3, a composing element the same as Embodiment 1 is denoted with a same reference sign, and description thereof is omitted, and only characteristic composing elements of Embodiment 3 will be described. For example, the image forming process, the configuration of the process cartridge A, and the configuration of the moving means 100 of the toner cartridge B are the same as Embodiment 1.

In the toner cartridge B of Embodiment 1, the pump portion 21, which can suction and discharge air by a known pump mechanism, is used, and the intake air path 24*b* and the exhaust air path 25*b* connected with the pump portion 21 are formed. In the toner cartridge B of Embodiment 3, on the other hand, a pump portion 51, which generates the intake air and the exhaust air by the expansion/contraction of a bellows member 26 is used, and a connection passage 30*a*, to be connected with the pump portion 51, is formed by a passage forming portion 30. Further, a check valve is disposed in the first passage P1 and the second passage P2 of the toner cartridge B of Embodiment 3. The pump portion 51 of Embodiment 3 and the passage of air will be described in detail.

Pump Portion 51

Figure 9:
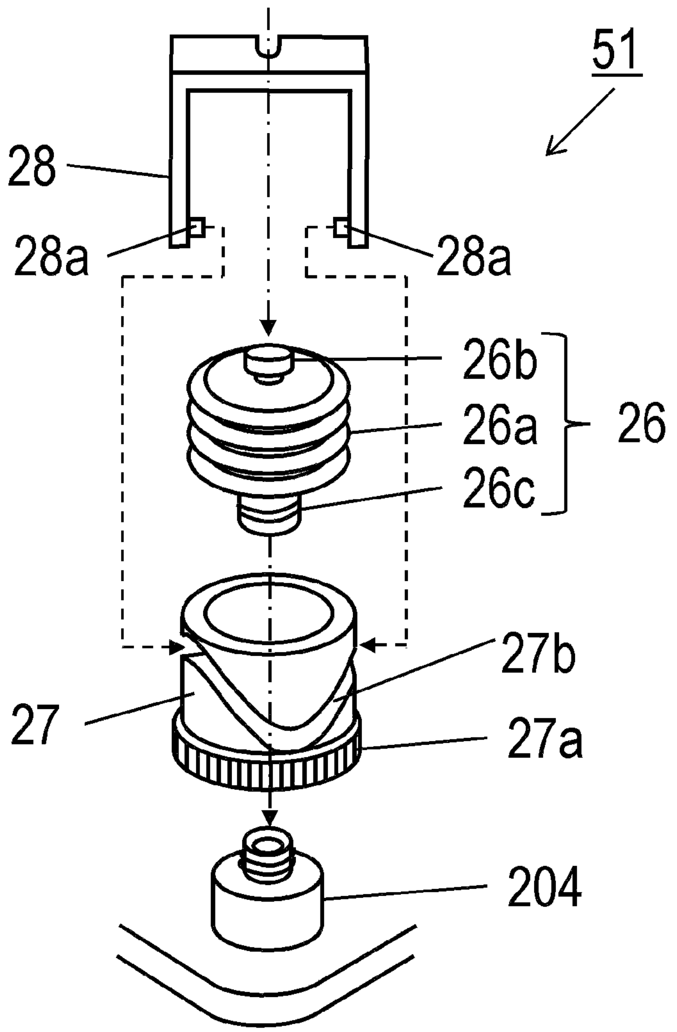
FIG. 9 is an exploded view of a pump portion of Embodiment 3.

First, the pump portion 51 and the detailed configuration of passages connected to the pump portion 51 will be described. FIG. 9 is an exploded view depicting the configuration of the pump portion 51. The pump portion 51 includes the bellows member 26, a pump driving gear 27, and a pump driving member 28, and is connected to a conveying path member 204. The pump portion 51 is configured to expand/contract in the top/bottom direction, and a cross-sectional shape at a cross-section vertical to the top/bottom direction of the pump portion 51, is approximately circular.

The bellows member 26 includes: a bellows portion 26*a* which expands/contracts to change the capacity thereof; an engaging portion 26*b* which is disposed in an upper part of the bellows member 26, and engages with the pump driving member 28; and a fixing portion 26*c* which is disposed in a lower part of the bellows member 26, and is fixed to the conveying path member 204. The bellows member 26 has an opening at the lower part, and the pump portion 51 generates the intake air and exhaust air to the first passage P1 and the second passage P2 via this opening.

The pump driving gear 27 includes: a gear portion 27*a* which receives driving force from a driving source disposed in the apparatus body C; and a grooved cam portion 27*b* which engages with a protruded portion 28*a* of the pump driving member 28. The cam portion 27*b* is formed throughout the entire outer peripheral surface of the pump driving gear 27, so as to form a wave pattern in the vertical direction. When the pump driving gear 27 rotates in a state where the protruded portion 28*a* and the cam portion 27*b* are engaged, the pump driving member 28 reciprocatingly moves in the vertical direction, and the bellows member 26 is repeatedly expanded/contracted by the pump driving member 28.

Figure 10A:
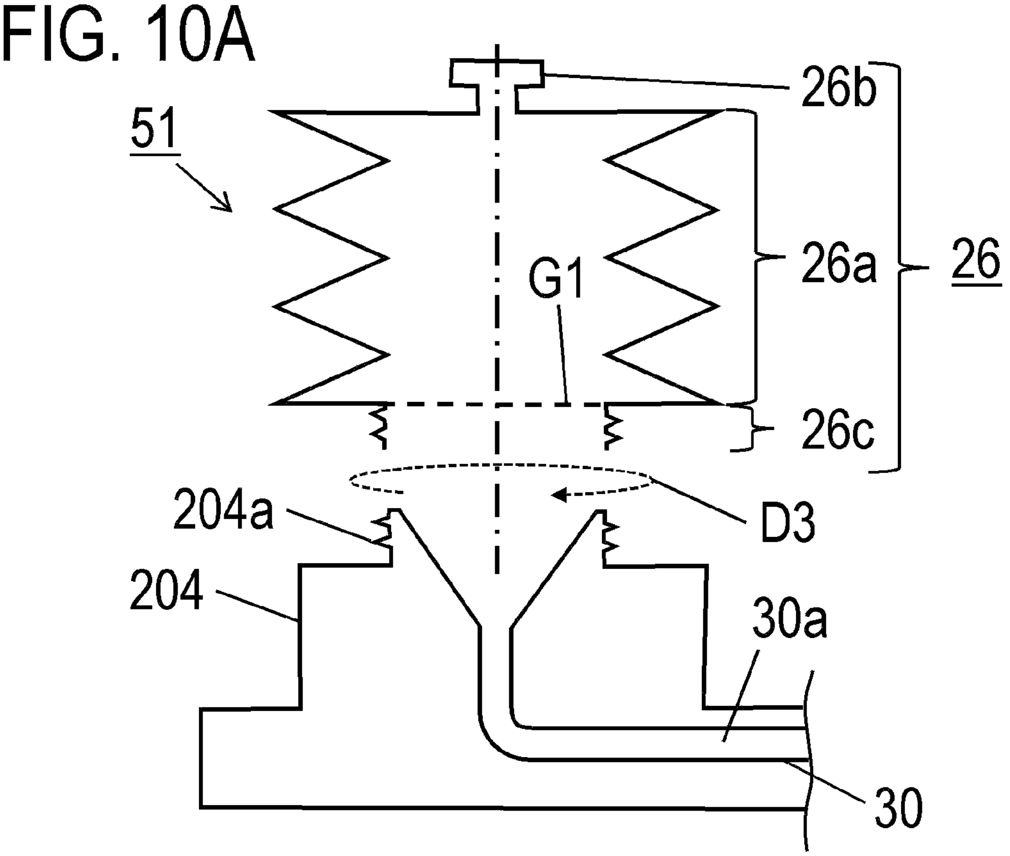
FIGS. 10A and 10B are schematic cross-sectional views of a bellows member and a conveying path member of Embodiment 3.
Figure 10B:
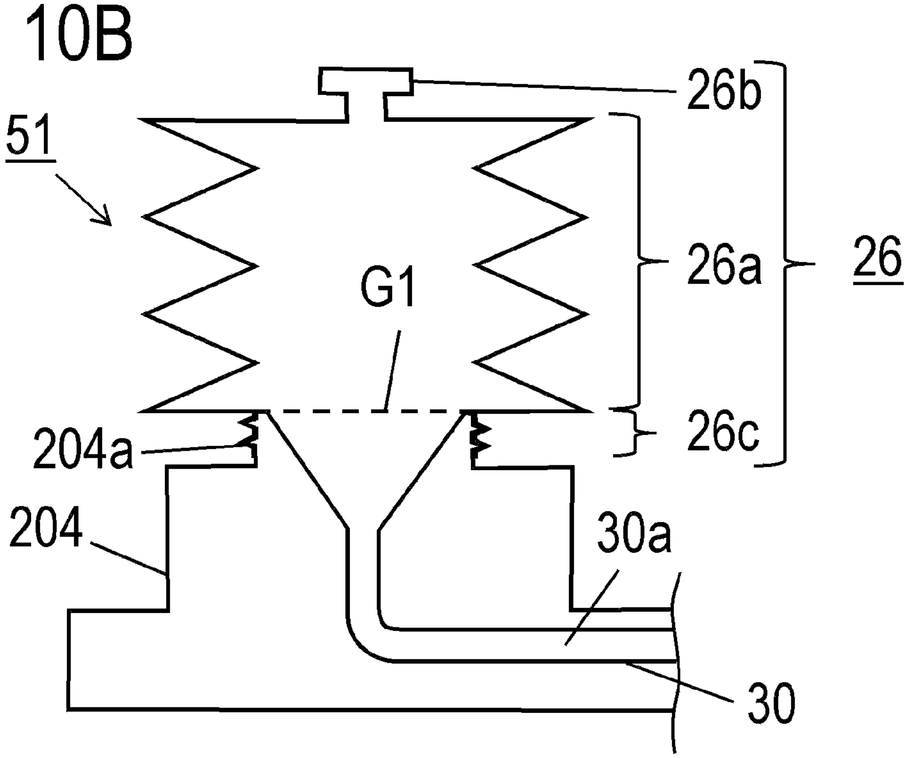

FIG. 10A is a schematic cross-sectional view depicting a state immediately before the bellows member 26 is fixed to the conveying path member 204. FIG. 10B is a schematic cross-sectional view depicting a state where the bellows member 26 is fixed to the conveying path member 204. The fixing portion 26*c* of the bellows member 26 is a female screw portion which engages with a fixed portion 204*a* which is a male screw portion of the conveying path member 204. When the fixing portion 26*c* engages with the fixed portion 204*a*, and the bellows member 26 is fixed to the conveying path member 204 thereby, the pump portion 51 is fixed to the toner cartridge B.

The fixed portion 204*a* of the conveying path member 204 is hollow inside, and a male screw is formed on the outer peripheral surface. The space inside the fixed portion 204*a* is connected to the connection passage 30*a* formed by the passage forming portion 30. The connection passage 30*a* constitutes a part of the first passage P1 which connects the pump portion 51 and the containing portion 22, and a part of the second passage P2 which connects the pump portion 51 and the discharging portion 23. In FIGS. 10A and 10B, a boundary G1 between the pump portion 51 and the passage forming portion 30 is indicated by a dotted line. The boundary G1 is also a boundary between the bellows portion 26*a* of the bellows member 26 and the fixing portion 26*c*.

Figure 11A:
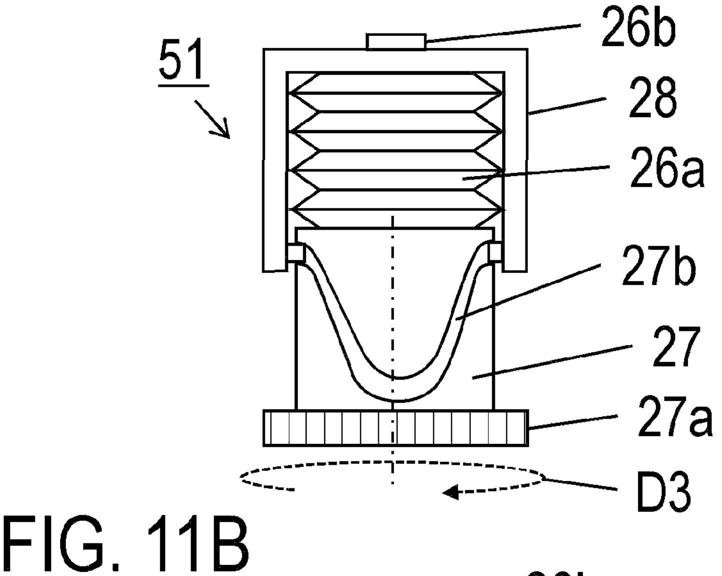
FIGS. 11A and 11B are front views of the pump portion of Embodiment 3.
Figure 11B:
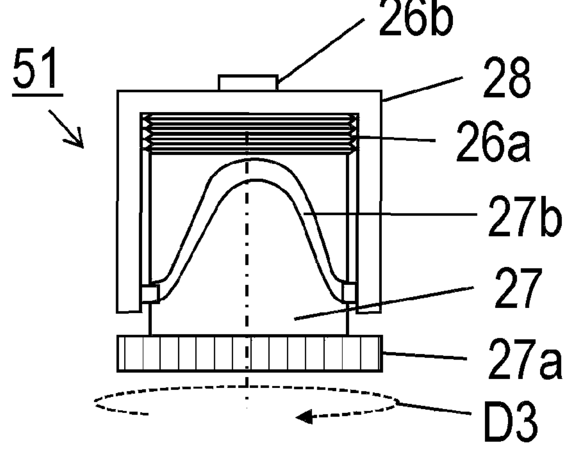

FIG. 11A is a front view of the pump portion 51 depicting a state where the bellows member 26 of the pump portion 51 is expanded, and FIG. 11B is a front view of the pump portion 51, depicting a state where the bellows member 26 of the pump portion 51 is contracted. As illustrated in FIG. 11A, the pump portion 51 becomes the expanded state when the protruded portion 28*a* is located above the cam portion 27*b*. On the other hand, as illustrated in FIG. 11B, the pump portion 51 becomes the contracted state when the protruded portion 28*a* is located below the cam portion 27*b*.

When the pump driving gear 27 rotates in the arrow D3 direction, the protruded portion 28*a* of the pump driving member 28 moves along the cam portion 27*b*, and the pump driving member 28 reciprocatingly moves in the vertical direction. Then along with the up/down movement of the pump driving member 28, the bellows member 26 expands/contracts and changes its capacity thereof, and the pump portion 51 generates the intake air and exhaust air.

Toner Cartridge B

Figure 12A:
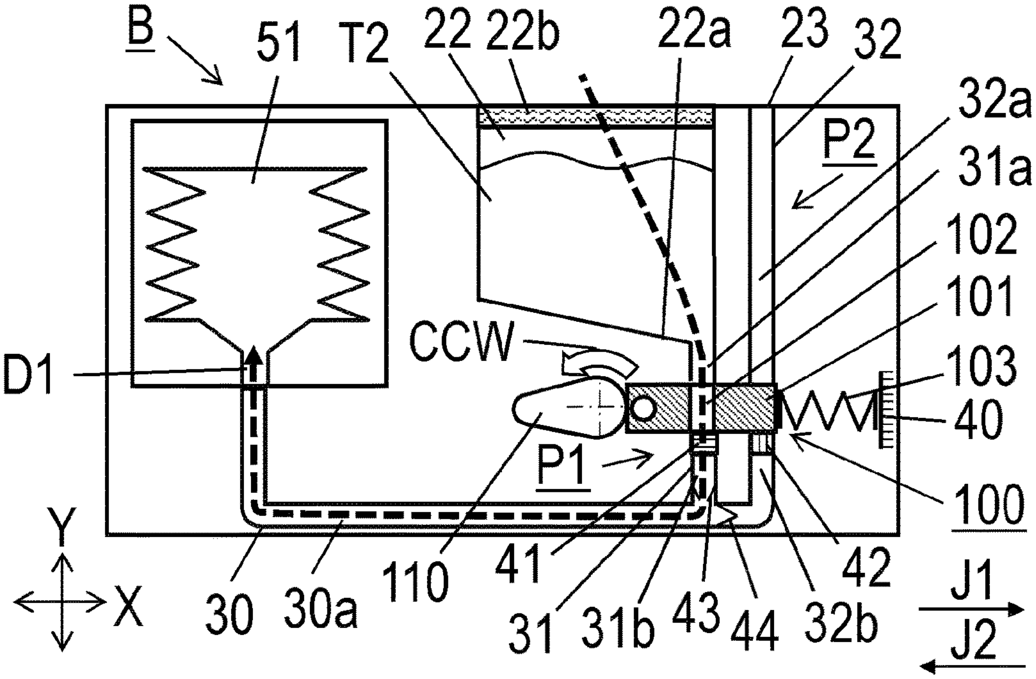
FIGS. 12A and 12B are schematic cross-sectional views of a toner cartridge of Embodiment 3.
Figure 12B:
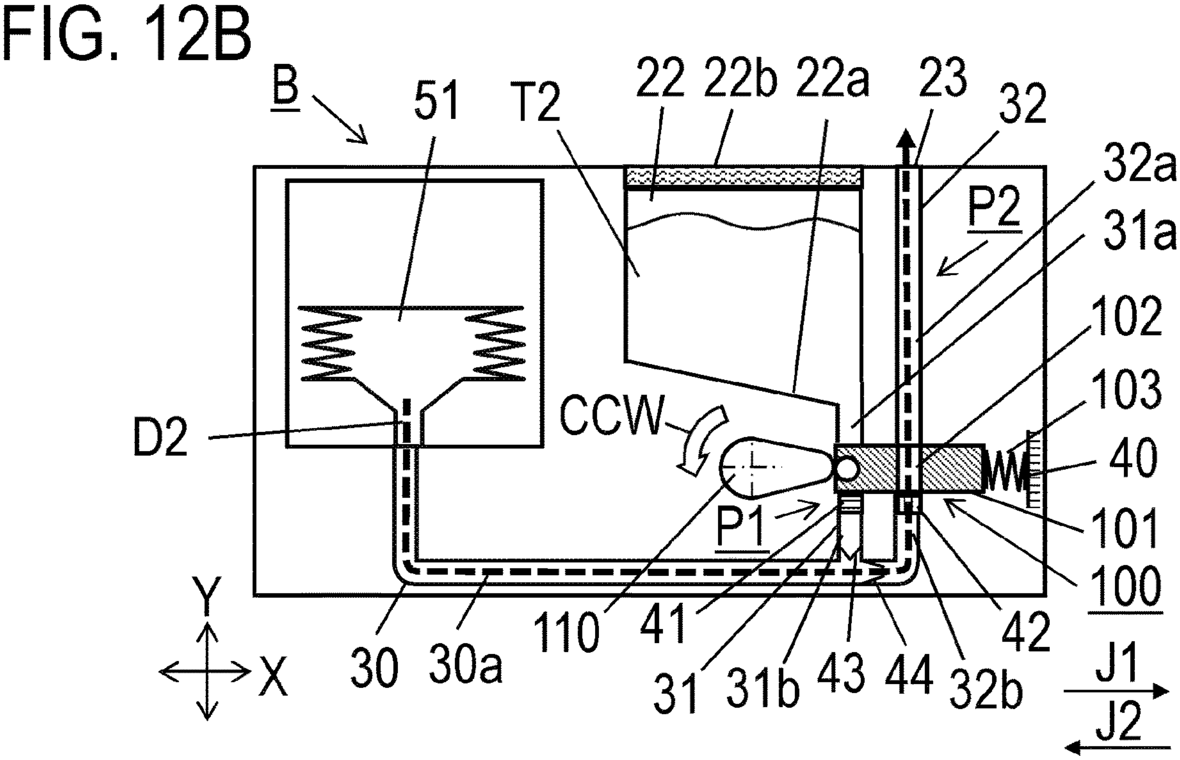

The air flow passage characteristic of the toner cartridge B of Embodiment 3 will be described next. FIGS. 12A and 12B are schematic cross-sectional views of a major configuration of the toner cartridge B of Embodiment 3. FIG. 12A indicates a state where the moving member 101 is at a first position, and toner T2 can be conveyed to the moving member 101. FIG. 12B indicates a state where the moving member 101 is at a second position, and toner T2 can be conveyed from the moving member 101.

The toner cartridge B of Embodiment 3 includes: a first passage forming portion 31 which forms the first passage P1 to connect the pump portion 21 and the containing portion 22; a second passage forming portion 32 which forms the second passage P2 to connect the pump portion 21 and the discharging portion 23; and the moving means 100. The first passage forming portion 31 forms a conveying path 31*a* which connects the containing portion 22 and the holding portion 102, and an intake air path 31*b* which connects the holding portion 102 and the connection passage 30*a*. In other words, the intake air path 31*b* of Embodiment 3 is connected to the pump portion 21 via the connection passage 30*a*. The second passage forming portion 32 forms a conveying path 32*a* which connects the discharging portion 23 and the holding portion 102, and an exhaust air path 32*b* which connects the holding portion 102 and the connection passage 30*a*. In other words, the exhaust air path 32*b* of Embodiment 3 is connected to the pump portion 21 via the connection passage 30*a*. Both the conveying path 31*a* and the conveying path 32*a* are configured approximately to be linear, and extend approximately in the vertical direction.

In Embodiment 3, as illustrated in FIG. 12A, the first passage P1 to connect the containing portion 22 and the pump portion 51 is constituted of the conveying path 31*a*, the holding portion 102 of the moving member 101, the intake air path 31*b*, and the connection passage 30*a*. In the first passage forming portion 31, a space, in which the moving member 101 is disposed, is created, and the first passage forming portion 31, together with the holding portion 102, forms the first passage P1 to connect the containing portion 22 and the passage forming portion 30.

The filter 41, which passes air flow and does not pass toner T2, is disposed inside the intake air path 31*b* below the moving member 101, so as to close the intake air inlet of the intake air path 31*b*. Further, a first check valve 43 is disposed inside the intake air path 31*b* below the filter 41. The first check valve 43 is configured to open when the air flows in the arrow D1 direction, so that air can pass, and to close when the air flows in the opposite direction of the arrow D1 direction, so that air does not pass. In other words, when the pump portion 51 generates the intake air, the air flows from the containing portion 22 to the pump portion 51 via the first passage P1. When the pump portion 51 generates the exhaust air, on the other hand, the first check valve 43 closes, and air does not flow from the pump portion 51 to the containing portion 22.

On the other hand, in Embodiment 3, as illustrated in FIG. 12B, the second passage P2 to connect the discharging portion 23 and the pump portion 51 is constituted of: the connection passage 30*a*, the exhaust air path 32*b*, the holding portion 102 of the moving member 101, and the conveying path 32*a*. In the second passage forming portion 32, a space, in which the moving member 101 is disposed, is created, and the second passage forming portion 32, together with the holding portion 102, forms the second passage P2 to connect the discharging portion 23 and the passage forming portion 30.

The filter 42, which passes air flow and does not pass toner T2, is disposed inside the exhaust air path 32*b* below the moving member 101, so as to close the exhaust air outlet of the exhaust air path 32*b*. Further, a second check valve 44 is disposed inside the exhaust air path 32*b* below the filter 42. The second check valve 44 is configured to open when air flows in the arrow D2 direction, so that air can pass, and to close when air flows in the opposite direction of the arrow D2 direction, so that air does not pass. In other words, when the pump portion 51 generates the exhaust air, the air flows from the pump portion 51 to the discharging portion 23 via the second passage P2. When the pump portion 51 generates the intake air, on the other hand, the second check valve 44 closes, and air does not flow from the discharging portion 23 to the pump portion 51.

Conveying Toner Inside Toner Cartridge B

Next a method for conveying toner T2 from the containing portion 22 to the discharging portion 23 inside the toner cartridge B of Embodiment 3 will be described. In cartridge B of Embodiment 3, toner T2 contained in the containing portion 22 is conveyed to the discharging portion 23 via the first passage P1, the holding portion 102 of the moving member 101, and the second passage P2.

Toner T2 inside the containing portion 22 is first conveyed to the holding portion 102 of the moving member 101. When the moving member 101 is at the first position, toner T2 is conveyed from the containing portion 22 to the holding portion 102 by gravity and the intake air generated by the pump portion 51. When the pump portion 51 expands at this time, the air flow in the arrow D1 direction is generated in the first passage P1. Further, the second check valve 44 disposed inside the second passage P2 closes by the intake air generated by the pump portion 51.

Then just like Embodiment 1, the cam member 110 rotates in the CCW direction, and the moving member 101 moves from the first position to the second position. Then toner T2 held in the holding portion 102 is conveyed from the first passage P1 to the second passage P2.

When the moving member 101 is at the second position in the state of holding toner T2, the second check valve 44 disposed inside the second passage P2 opens by the exhaust air generated by the pump portion 51. Then toner T2 inside the holding portion 102 is conveyed to the discharging portion 23 via the second passage P2. If the pump portion 51 is contracted at this time, the air flow in the arrow D2 direction is generated in the second passage P2. Then the first check valve 43, disposed inside the first passage P1, closes by the exhaust air generated by the pump portion 51. Then toner T2 is discharged from the toner cartridge B via the discharging portion 23, and is supplied to the process cartridge A.

In Embodiment 3, the check valve is disposed inside the passage, but application of the present invention is not limited to this configuration. For example, the present invention can be suitably applied to a configuration where a mechanism to open/close the passage is disposed instead of the check valve. The passage open/close mechanism may be any configuration with which the first passage P1 can be opened and the second passage P2 can be closed when the pump portion 51 intakes air, and the second passage P2 can be opened and the first passage P1 can be closed when the pump portion 51 exhausts air.

As described above, according to the configuration of Embodiment 3, toner amount to be supplied from the containing portion 22 of the toner cartridge B to the containing portion 17 of the process cartridge A can be controlled, and thereby a predetermined amount of toner can be stably conveyed. Further, a single pump performs the exhaust and intake of air, hence just like Embodiment 1, manufacturing cost can be reduced, space in the toner cartridge B can be conserved, and toner can be conveyed at high efficiency.

Further, in Embodiment 3, the connection passage 30*a* constitutes a part of the first passage P1 and a part of the second passage P2, hence a number of passages connected to the pump portion 51 becomes one, and the air passages of the toner cartridge B can be simplified. Further, compared with the configuration of Embodiment 1, the space in the toner cartridge B can be conserved even more.

Embodiment 4

Embodiment 4 according to the present invention will be described next. The toner cartridge B of Embodiment 4 includes the moving means 200, the same as Embodiment 2, and the pump portion 51, the same as Embodiment 3. In the description of Embodiment 4, a composing element the same as the above mentioned embodiments is denoted with a same reference sign and description thereof is omitted, and only characteristic composing elements of Embodiment 4 will be described. For example, the image forming process and the configuration of the process cartridge A are the same as Embodiment 1.

Figure 13A:
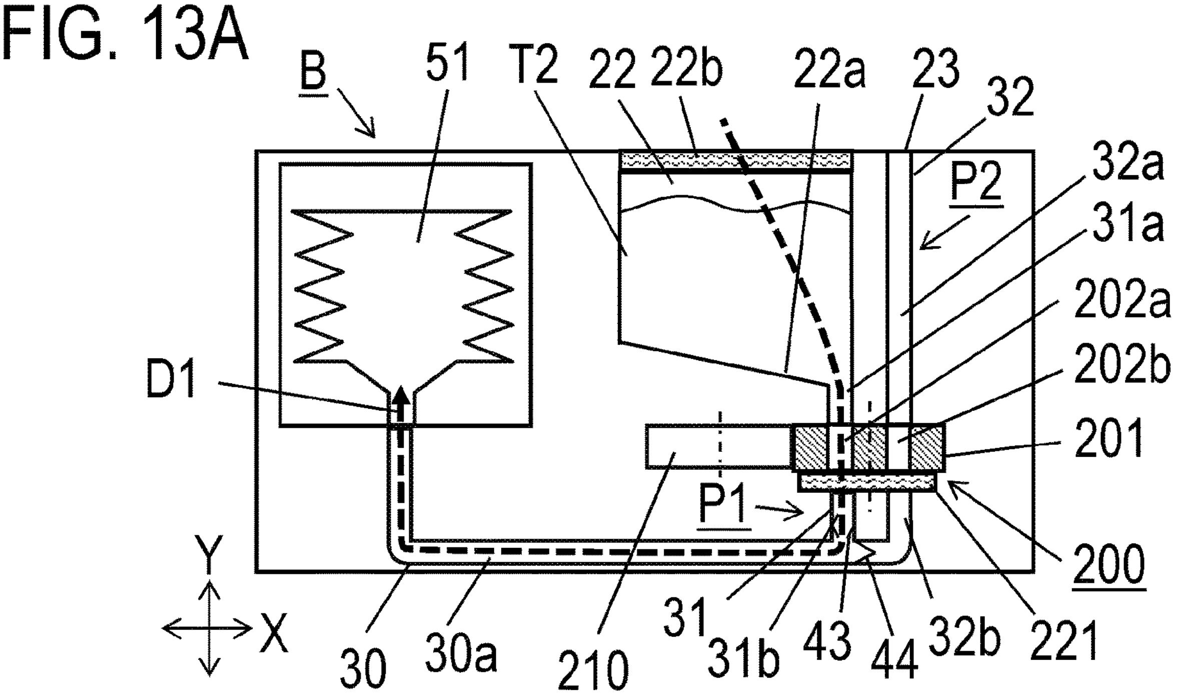
FIGS. 13A and 13B are schematic cross-sectional views of a toner cartridge of Embodiment 4.
Figure 13B:
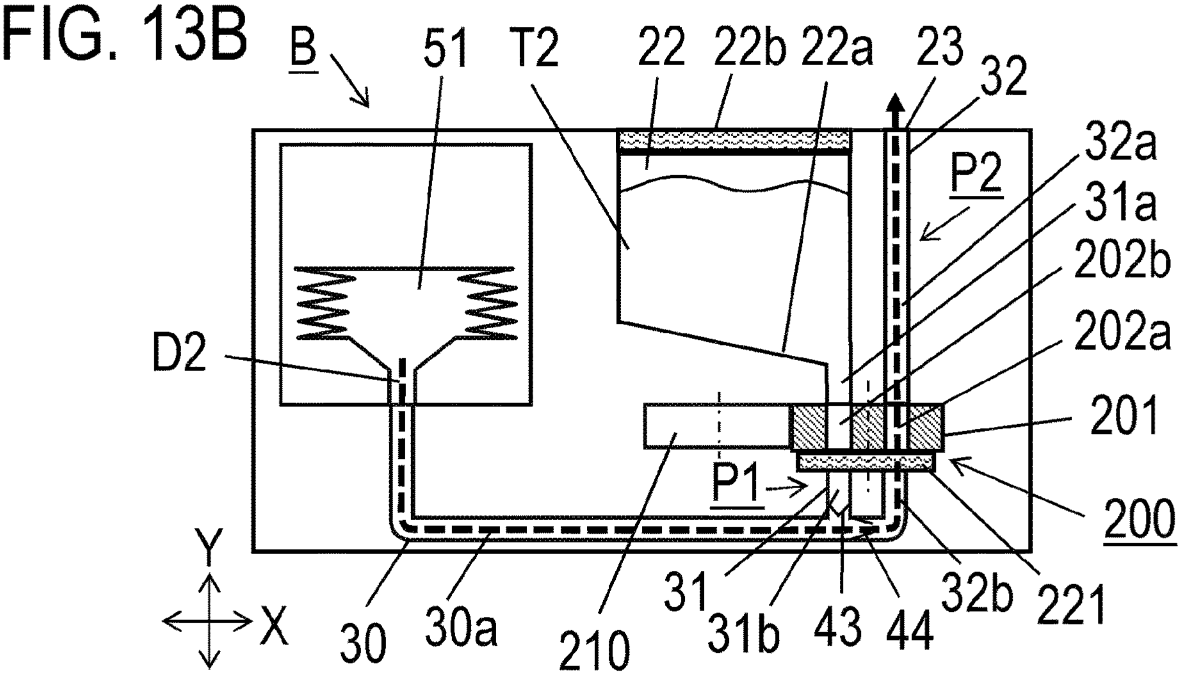

FIGS. 13A and 13B are schematic cross-sectional views of a major configuration of the toner cartridge B of Embodiment 4. FIG. 13A indicates a state of the toner cartridge B, where the moving member 201 is at the first position, and toner T2 can be conveyed to the moving member 201. FIG. 13B indicates a state of the toner cartridge B, where the moving member 201 is at the second position, and toner T2 can be conveyed from the moving member 201.

Conveying Toner Inside Toner Cartridge B

A method for conveying toner T2 from the containing portion 22 to the discharging portion 23 inside the toner cartridge B of Embodiment 4 will be described. In the toner cartridge B of Embodiment 4, toner T2 contained in the containing portion 22 is conveyed to the discharging portion 23 via the first passage P1, the holding portions 202 of the moving member 201, and the second passage P2. In the following, a case of conveying toner T2 using the first holding portion 202*a*, out of the plurality of holding portions 202, will be described as an example.

First, in the state where the moving member 201 is at the first position, the pump portion 51 expands and generates the intake air, whereby outside air is taken in from the containing portion 22, and air flow in a direction from the containing portion 22 to the pump portion 51 (arrow D1 direction) is generated inside the first passage P1. Then toner T2 is conveyed from the containing portion 22 to the first holding portion 202*a* by gravity and the intake air, and is supported by the filter 221. By the intake air generated by the pump portion 21, toner T2 is held in the first holding portion 202*a* in a consolidated state. Further, by the intake air generated by the pump portion 51, the second check valve 44, disposed in the second passage P2, is closed.

Then as the teeth missing gear 210 rotates, the moving member 201 rotationally moves from the first position to the second position. By the moving member 201 moving to the second position, the first holding portion 202*a*, together with toner T2 therein, moves from the first passage P1 to the second passage P2. Then the moving member 201 moves so as to scrape off toner overflowing from the first holding portion 202*a*, whereby a predetermined amount of toner is conveyed from the first passage P1 to the second passage P2. Then the first holding portion 202*a* in the state of holding toner T2 therein constitutes a part of the second passage P2.

By the pump portion 51 being contracted to generate the exhaust air in the state where the moving member 201 is located at the second position, the air flow in the direction from the pump portion 51 to the discharging portion 23 (arrow D2 direction) is generated inside the second passage P2. By this air flow, the second check valve 44 inside the second passage P2 opens, and toner T2 inside the first holding portion 202*a* is conveyed to the discharging portion 23 via the second passage P2. Then toner T2 is discharged from the toner cartridge B, and is supplied to the process cartridge A.

As described above, according to the configuration of Embodiment 4, the toner amount to be supplied from the containing portion 22 of the toner cartridge B to the containing portion 17 of the process cartridge A can be controlled, and thereby a predetermined amount of toner can be stably conveyed. Further, a single pump performs the exhaust and intake of air, hence just like Embodiment 1, manufacturing cost can be reduced, space in the toner cartridge B can be conserved, and toner can be conveyed at high efficiency.

Further, in Embodiment 4, the passage forming portion 30 constitutes a part of the first passage P1 and a part of the second passage P2, hence a number of passages connected to the pump portion 51 becomes one, and the air passage of the toner cartridge B can be simplified. Further, compared with the configuration of Embodiment 1, the space of the toner cartridge B can be conserved even more.

Embodiment 5

Embodiment 5 according to the present invention will be described next. The toner cartridge B of Embodiment 5 includes: moving means 300 which moves toner by rotating a moving member 301, and the pump portion 51 the same as Embodiment 3. In the description of Embodiment 5, a composing element the same as the above mentioned embodiments denoted with a same reference sign and description thereof is omitted, and only characteristic composing elements of Embodiment 5 will be described. For example, the image forming process and the configuration of the process cartridge A are the same as Embodiment 1.

Figure 14A:
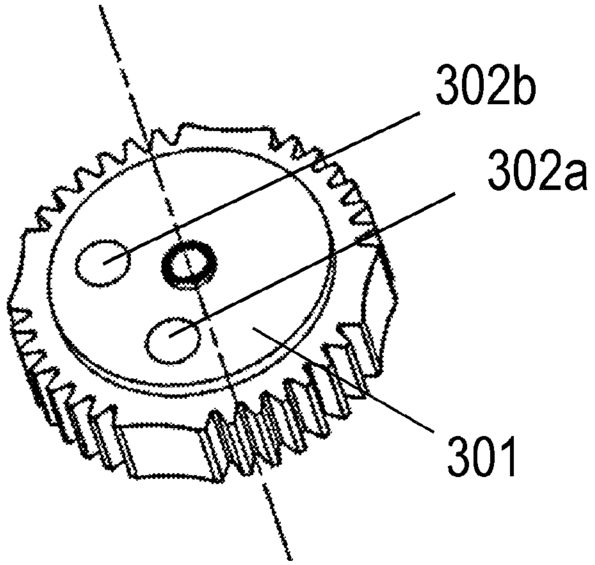
FIGS. 14A and 14B are perspective views of a moving member of Embodiment 5.
Figure 14B:
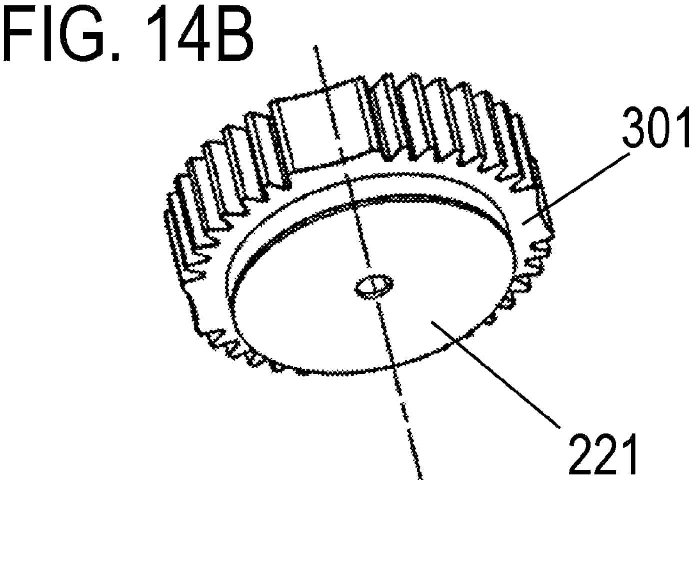
Figure 15A:
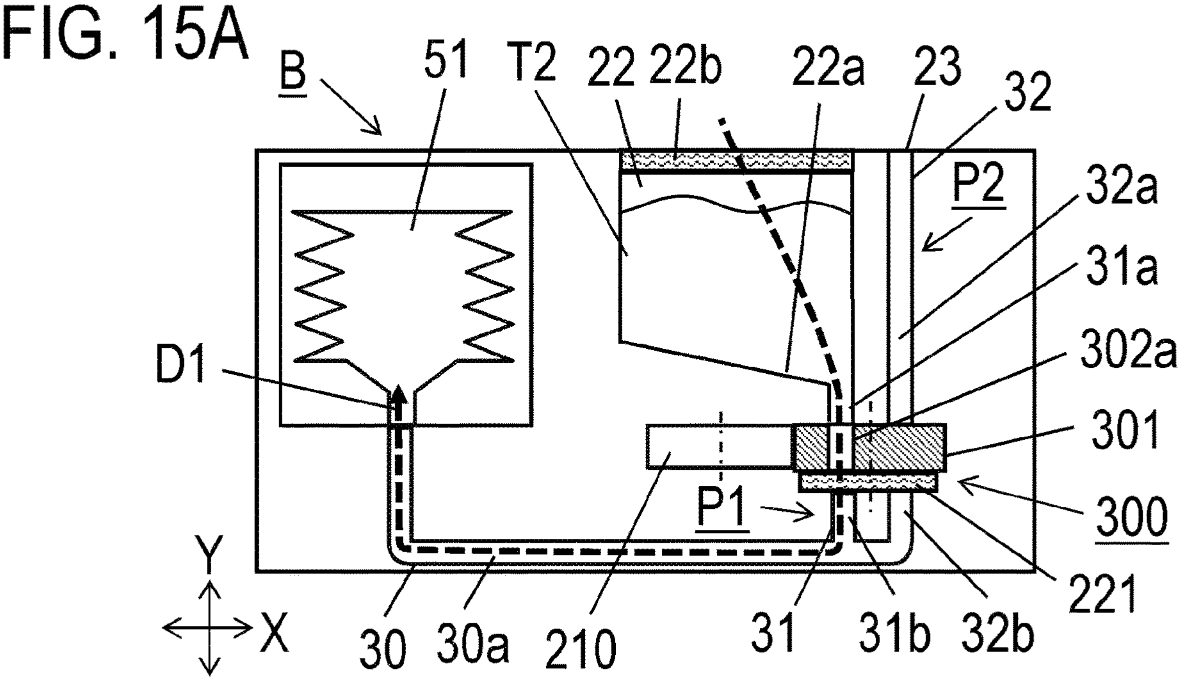
FIGS. 15A and 15B are schematic cross-sectional views of a toner cartridge of Embodiment 5.
Figure 15B:
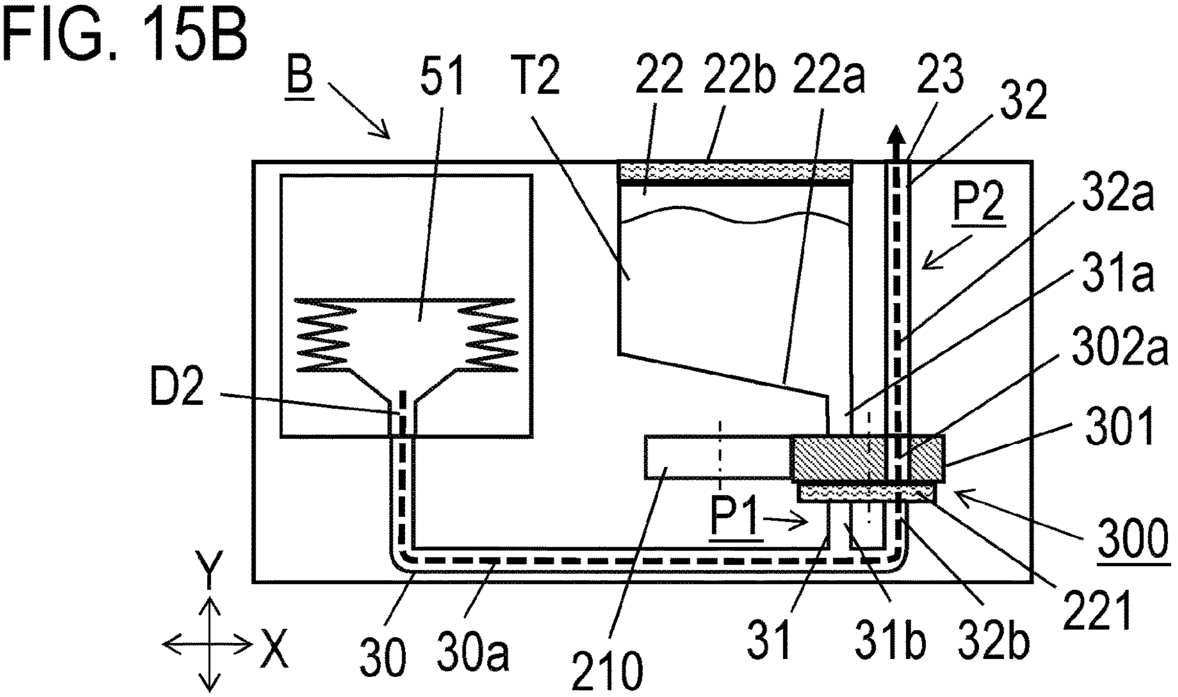

In Embodiment 5, compared with Embodiment 4, the configuration of the moving member is changed, and the check valves are eliminated from the first passage P1 and the second passage P2. FIG. 14A is a perspective view when the moving member 301 of the moving means 300 is viewed from the top. FIG. 14B is a perspective view when the moving member 301 and the filter 221 are viewed from the bottom. FIGS. 15A and 15B are schematic cross-sectional views of a major configuration of the toner cartridge B of Embodiment 5. FIG. 15A indicates a state of the toner cartridge B where the moving member 301 is at the first position, and toner T2 can be conveyed to the moving member 301. FIG. 15B indicates a state of the toner cartridge B where the moving member 301 is at the second position, and toner T2 can be conveyed from the moving member 301.

A configuration of the moving means 300 will be described first. The moving means 300 includes: the moving member 301 which can rotate around the rotation axis line extending in the virtual direction; the teeth missing gear 210 which can rotate around the rotation axis line extending in the virtual direction and engage with the moving member 301; and the filter 221 which is disposed in the lower part of the moving member 301. The configurations of the teeth missing gear 210 and the filter 221 are the same as those of Embodiment 2 and Embodiment 4.

As illustrated in FIG. 14A, the moving member 301 includes a first holding portion 302*a* and a second holding portion 302*b*. The first holding portion 302*a* and the second holding portion 302*b* are both cylindrical connecting holes through which the moving member 301 runs in the vertical direction. The first holding portion 302*a* is disposed at a position when the moving member 301 is rotated 90° from the position of the second holding portion 302*b*. In other words, an angle formed by a line connecting the center of the first holding portion 302*a*, and the rotation center of the moving member 301 and a line connecting the center of the second holding portion 302*b* and the rotation center of the moving member 301, is 90°.

When the moving member 301 is at the first position, the first holding portion 302*a* is connected with the conveying path 31*a* and the intake air path 31*b*, and the first passage P1 is connected from the containing portion 22 to the pump portion 51. When the moving member 301 is at the first position, on the other hand, neither the first holding portion 202*a* nor the second holding portion 202*b* is connected with the second passage forming portion 32, and the second passage P2 is closed by the moving member 301.

Further, when the moving member 301 is at the second position, the first holding portion 302*a* is connected with the conveying path 32*a* and the exhaust air path 32*b*, and the second passage P2 is connected from the discharging portion 23 to the pump portion 51. When the moving member 301 is at the second position, on the other hand, neither the first holding portion 202*a* nor the second holding portion 202*b* is connected with the first passage forming portion 31, and the first passage P1 is closed by the moving member 301.

Conveying Toner Inside the Toner Cartridge B

A method for conveying toner T2 from the containing portion 22 to the discharging portion 23 inside the toner cartridge B of Embodiment 5 will be described. In the toner cartridge B of Embodiment 5, toner T2 contained in the containing portion 22 is conveyed to the discharging portion 23 via the first passage P1, the first holding portion 302*a* or the second holding portion 302*b* of the moving member 301, and the second passage P2. In the following, a case of conveying toner T2 using the first holding portion 302*a* will be described as an example.

First, in the state where the moving member 301 is at the first position, the pump portion 51 expands and generates the intake air, whereby outside air is taken in from the containing portion 22, and air flow in a direction from the containing portion 22 to the pump portion 51 (arrow D1 direction) is generated inside the first passage P1. Then toner T2 is conveyed from the containing portion 22 to the first holding portion 302*a* by gravity and the intake air, and is supported by the filter 221. By the intake air generated by the pump portion 21, toner T2 is held in the first holding portion 302*a* in a consolidated state. On the other hand, when the moving member 301 is at the first position, the second passage P2 is closed by the moving member 301, hence air does not flow from the discharging portion 23 to the pump portion 51, even if the pump portion 51 generates intake air.

Then as the teeth missing gear 210 rotates, the moving member 301 rotationally moves from the first position to the second position. By the moving member 301 moving to the second position, the first holding portion 302*a*, together with toner T2 therein, moves from the first passage P1 to the second passage P2. Then the moving member 301 moves so as to scrape off toner overflowing from the first holding portion 302*a*, whereby a predetermined amount of toner is conveyed from the first passage P1 to the second passage P2. Then the first holding portion 302*a* in the state of holding toner T2 therein constitutes a part of the second passage P2.

By the pump portion 51 being contracted to generate the exhaust air in the state where the moving member 301 is located at the second position, the air flow in the direction from the pump portion 51 to the discharging portion 23 (arrow D2 direction) is generated inside the second passage P2. By this air flow, toner T2 inside the first holding portion 302*a* is conveyed to the discharging portion 23 via the second passage P2. Then toner T2 is discharged from the toner cartridge B, and is supplied to the process cartridge A. On the other hand, when the moving member 301 is at the second position, the first passage P1 is closed by the moving member 301, hence even if the pump portion 51 generates the exhaust air, the air does not flow from the pump portion 51 to the containing portion 22.

As described above, according to the configuration of Embodiment 5, the toner amount to be supplied from the containing portion 22 of the toner cartridge B to the containing portion 17 of the process cartridge A can be controlled, and thereby a predetermined amount of toner can be stably conveyed. Further, a single pump performs exhaust and intake of air, hence just like Embodiment 1, manufacturing cost can be reduced, space in the toner cartridge B can be conserved, and toner can be conveyed at high efficiency.

Further, according to the configuration of Embodiment 5, the first passage P1 and the second passage P2 do not connect simultaneously, regardless the rotation phase of moving means 300. Therefore there is no need to dispose the check valve in the first passage P1 and the second passage P2, which means that in Embodiment 5, the check valve can be eliminated, and manufacturing cost can be reduced compared with the configuration of Embodiment 4. Further, the check valve disposed in the second passage P2 may interfere with conveying toner, but there is no such problem in Embodiment 5.

Modifications

In each of the above embodiments, the process cartridge A and the toner cartridge B are removable from the apparatus body C, but application of the present invention is not limited to such configurations. For example, the present invention can be suitably applied even to a configuration where a developer replenishing device having similar functions as the toner cartridge B cannot be removed from the apparatus body C. In other words, it does not matter whether or not the developer replenishing device, to which the present invention is applicable, is removable from the apparatus main unit of the imaging forming apparatus.

Further, in each of the above embodiments, the pump portion is disposed in the toner cartridge B, but the present invention can be suitably applied to a configuration where the pump portion is disposed in the apparatus body C independently from the toner cartridge B. In the same manner, in each of the above embodiments, the moving means is disposed in the toner cartridge B, but the present invention can be suitably applied to a configuration where the moving means and the moving member are disposed in the apparatus body C independently from the toner cartridge B. These modifications are particularly effective to simplify the configuration of the toner cartridge B.

According to the present invention, a developer replenishing device that can stably convey toner can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-188710, filed on Nov. 25, 2022, which is hereby incorporated by reference herein in its entirety.

What is claimed is:

1. A developer replenishing device comprising:
a containing portion configured to contain developer;
a conveying path forming portion configured to form a conveying path of developer, the conveying path including a conveying inlet through which developer enters and a conveying outlet through which developer is discharged to outside of the developer replenishing device;
a moving member including a holding portion configured to hold developer supplied from the containing portion, the moving member being configured to be movable to a first position at which the holding portion is connected to the containing portion, and a second position at which the holding portion is connected to the conveying inlet of the conveying path;
an exhaust air portion configured to generate exhaust air; and
a filter configured to pass air flow and not to pass developer, wherein
in a case where the moving member is at the second position, the filter is disposed such that developer is held inside the holding portion, and exhaust air generated by the exhaust air portion is allowed to enter the holding portion, and the holding portion is located below the conveying inlet in a gravity direction.

2. The developer replenishing device according to claim 1, wherein
the conveying outlet is located above the conveying inlet in the gravity direction, and wherein
the conveying path formed by the conveying path forming portion is configured approximately to be linear.

3. The developer replenishing device according to claim 1, wherein
the holding portion is a connecting hole having a first opening that is connected to the conveying inlet in a case where the moving member is at the second position, and a second opening that is disposed at an opposite end of the first opening, and wherein
the filter is disposed so as to close the second opening inside the connecting hole.

4. The developer replenishing device according to claim 1, further comprising
an exhaust air path forming portion configured to form an exhaust air path, the exhaust air path forming portion including an exhaust air inlet connected to the exhaust air portion, and an exhaust air outlet to be an outlet of exhaust air generated by the exhaust air portion, wherein
in a case where the moving member is at the second position, the holding portion is connected to the exhaust air outlet, and wherein
the filter is disposed so as to close the exhaust air outlet inside the exhaust air path.

5. The developer replenishing device according to claim 4, wherein
the exhaust air portion is a pump portion which can intake air in addition to exhausting air, wherein
the developer replenishing device further comprises an intake air path forming portion configured to form an intake air path, the intake air path including an intake air outlet connected to the pump portion, and an intake air inlet to be an inlet of intake air generated by the pump portion, and wherein
in a case where the moving member is at the first position, the holding portion is connected to the intake air inlet of the intake air path.

6. The developer replenishing device according to claim 5, wherein
in the case where the moving member is at the first position, the holding portion is located below the containing portion in the gravity direction.

7. The developer replenishing device according to claim 5, wherein
the filter is a first filter, and wherein
the developer replenishing device further comprises a second filter which is disposed so as to close the intake air inlet inside the intake air path, and the second filter passes air flow and does not pass developer.

8. The developer replenishing device according to claim 1, further comprising
a reciprocating mechanism configured to reciprocate the moving member between the first position and the second position.

9. The developer replenishing device according to claim 8, wherein
the reciprocating mechanism includes a pressing portion configured to press the moving member in a first direction, and an urging portion configured to urge the moving member in a second direction, which is an opposite direction of the first direction.

10. The developer replenishing device according to claim 1, further comprising
a rotating mechanism configured to rotate the moving member to move the moving member to the first position and the second position.

11. The developer replenishing device according to claim 10, wherein
the filter is disposed so as to close the holding portion below the moving member.

12. The developer replenishing device according to claim 10, wherein
the holding portion is a first holding portion, wherein
the moving member further comprises a second holding portion configured to hold developer supplied from the containing portion, and wherein
in a case where the moving member is at the second position, the second holding portion is connected to the containing portion.

13. The developer replenishing device according to claim 10, further comprising
a supply path forming portion including a supply port which is connected to the holding portion in a case where the moving member is at the first position, the supply path forming portion being connected to the containing portion so as to form a supply path in which developer, supplied from the containing portion to the holding portion, is conveyed, wherein
in the case where the moving members is at the first position, the conveying inlet of the conveying path is closed by the moving member, and wherein
in the case where the moving member is at the second position, the supply port of the supply path is closed by the moving member.

14. The developer replenishing device according to claim 5, further comprising:
a first check valve disposed inside the exhaust air path, the first check valve being opened by an air flow from the exhaust air inlet to the exhaust air outlet, and being closed by an air flow from the exhaust air outlet to the exhaust air inlet; and a second check valve disposed inside the intake air path, the second check valve being opened by an air flow from the intake air inlet to the exhaust air outlet, and being closed by an air flow from the intake air outlet to the intake air inlet.

15. The developer replenishing device according to claim 14, further comprising a passage forming portion configured to form a connection passage, the connection passage being connected to the pump portion, the exhaust air inlet and the intake air outlet, wherein the exhaust air path is connected to the pump portion via the connection passage, and wherein the intake air path is connected to the pump portion via the connection passage.

16. An image forming apparatus comprising:

a developer replenishing device; and an image forming portion configured to form an image on a recording material using developer discharged from the developer replenishing device, wherein the developer replenishing device includes:

a containing portion configured to contain developer;

a conveying path forming portion configured to form a conveying path of developer, the conveying path including a conveying inlet through which developer enters and a conveying outlet through which developer is discharged to outside of the developer replenishing device;

a moving member including a holding portion configured to hold developer supplied from the containing portion, the moving member being configured to be movable to a first position at which the holding portion is connected to the containing portion, and a second position at which the holding portion is connected to the conveying inlet of the conveying path;

an exhaust air portion configured to generate exhaust air; and a filter configured to pass air flow and not to pass developer, wherein in a case where the moving member is at the second position, the filter is disposed, together with the holding portion, such that developer is held inside the holding portion, and exhaust air generated by the exhaust air portion is allowed to enter the holding portion, and wherein in the case where the moving member is at the second position, the holding portion is located below the conveying inlet in a gravity direction.

* * * * *